(12) United States Patent
Abari et al.

(10) Patent No.: US 11,662,445 B2
(45) Date of Patent: May 30, 2023

(54) ADAPTIVE LIDAR SYSTEM

(71) Applicant: Woven Planet North America, Inc., Los Altos, CA (US)

(72) Inventors: Farzad Cyrus Foroughi Abari, San Bruno, CA (US); Romain Clément, Campbell, CA (US); Roxie Lynn Paine, Mountain View, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 958 days.

(21) Appl. No.: 16/422,761

(22) Filed: May 24, 2019

(65) Prior Publication Data

US 2019/0361100 A1 Nov. 28, 2019

Related U.S. Application Data

(60) Provisional application No. 62/676,833, filed on May 25, 2018.

(51) Int. Cl.

| | |
|---|---|
| *G01S 17/42* | (2006.01) |
| *G01S 17/00* | (2020.01) |
| *G01S 7/484* | (2006.01) |
| *G01S 7/497* | (2006.01) |
| *G01S 17/66* | (2006.01) |
| *G01S 13/00* | (2006.01) |

(52) U.S. Cl.
CPC .................................. *G01S 7/497* (2013.01)

(58) Field of Classification Search
USPC ................... 348/140, 118, 120, 61, 148, 142
See application file for complete search history.

(56) References Cited

U.S. PATENT DOCUMENTS

| | | | | |
|---|---|---|---|---|
| 2016/0216376 | A1* | 7/2016 | Patil | G01S 17/36 |
| 2017/0261612 | A1* | 9/2017 | Akiyama | G01S 7/4865 |
| 2018/0284779 | A1* | 10/2018 | Nix | G08G 1/0962 |
| 2019/0137610 | A1* | 5/2019 | Li | G01S 17/931 |
| 2021/0149028 | A1* | 5/2021 | Gong | G01S 7/4861 |

* cited by examiner

*Primary Examiner* — Daquan Zhao

(74) *Attorney, Agent, or Firm* — Christopher G. Darrow; Darrow Mustafa PC

(57) ABSTRACT

In one embodiment, a computing system may transmit, using one or more light emitters, light beams of different wavelengths simultaneously into a surrounding environment. The system may determine a characteristic of the surrounding environment based on reflections of the light beams. In response to a determinization that the characteristic of the surrounding environment satisfies a criterion, the system may configure the one or more light emitters to transmit light beams of different wavelengths sequentially into the surrounding environment for measuring distances to one or more objects in the surrounding environment.

20 Claims, 10 Drawing Sheets

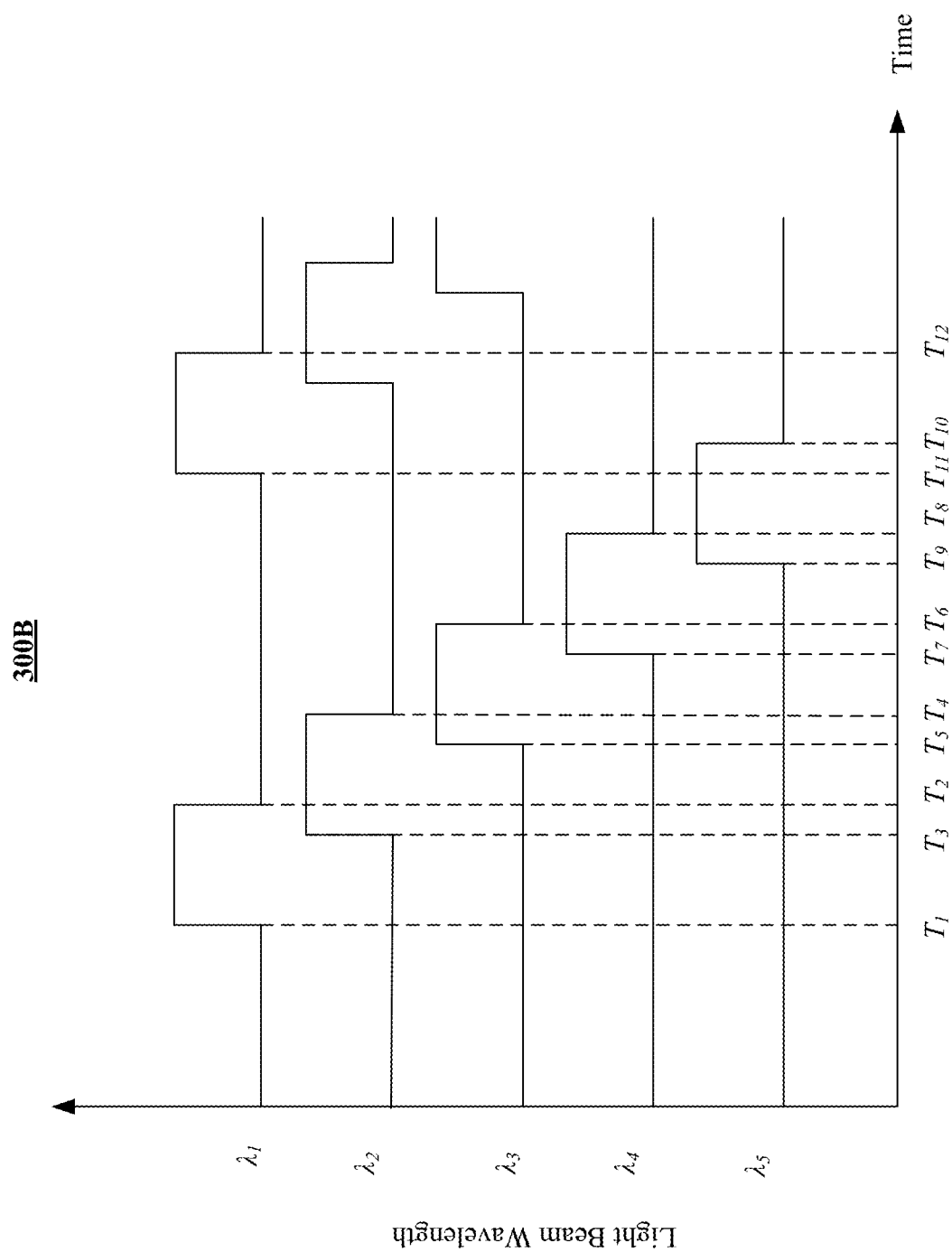

ADAPTIVE LIDAR SYSTEM

PRIORITY

This application claims the benefit, under 35 U.S.C. § 119(e), of U.S. Provisional Patent Application No. 62/676,833 filed 25 May 2018, which is incorporated herein by reference.

BACKGROUND

Light Detection and Ranging (LiDAR) is a sensing method that uses a light beam to measure the distance to various objects. A LiDAR system works by emitting a light beam into space where objects are located and measuring the time it takes for the light beam to return as it reflects off of any of those objects. The time measurement is combined with the location of the LiDAR system to determine a precise location of a surface point of an object, and this location is recorded as a three-dimensional point in space. One of the many uses of a LiDAR system is to help vehicles (e.g., whether autonomous vehicles or conventional human-driven vehicles) obtain depth profiles of the surrounding environment for computer-aided driving.

Since LiDAR measurements are based on the round-trip flight of light, environment conditions that affect the emitted lights' characteristics may have a negative impact on the LiDAR system performance. For example, when the environment is humid, the emitted light may be absorbed by the water vapor in the air. Consequently, the LiDAR system may have dramatically reduced signal-to-noise ratio (SNR), which may lead to less accurate measurement and potentially less safe operation for vehicles using the LiDAR system.

BRIEF DESCRIPTION OF THE DRAWINGS

FIG. 3B illustrates an example time sequence with partially overlapping transmitting time periods for sequentially transmitting light beams of different wavelengths.

DESCRIPTION OF EXAMPLE EMBODIMENTS

Figure 1:
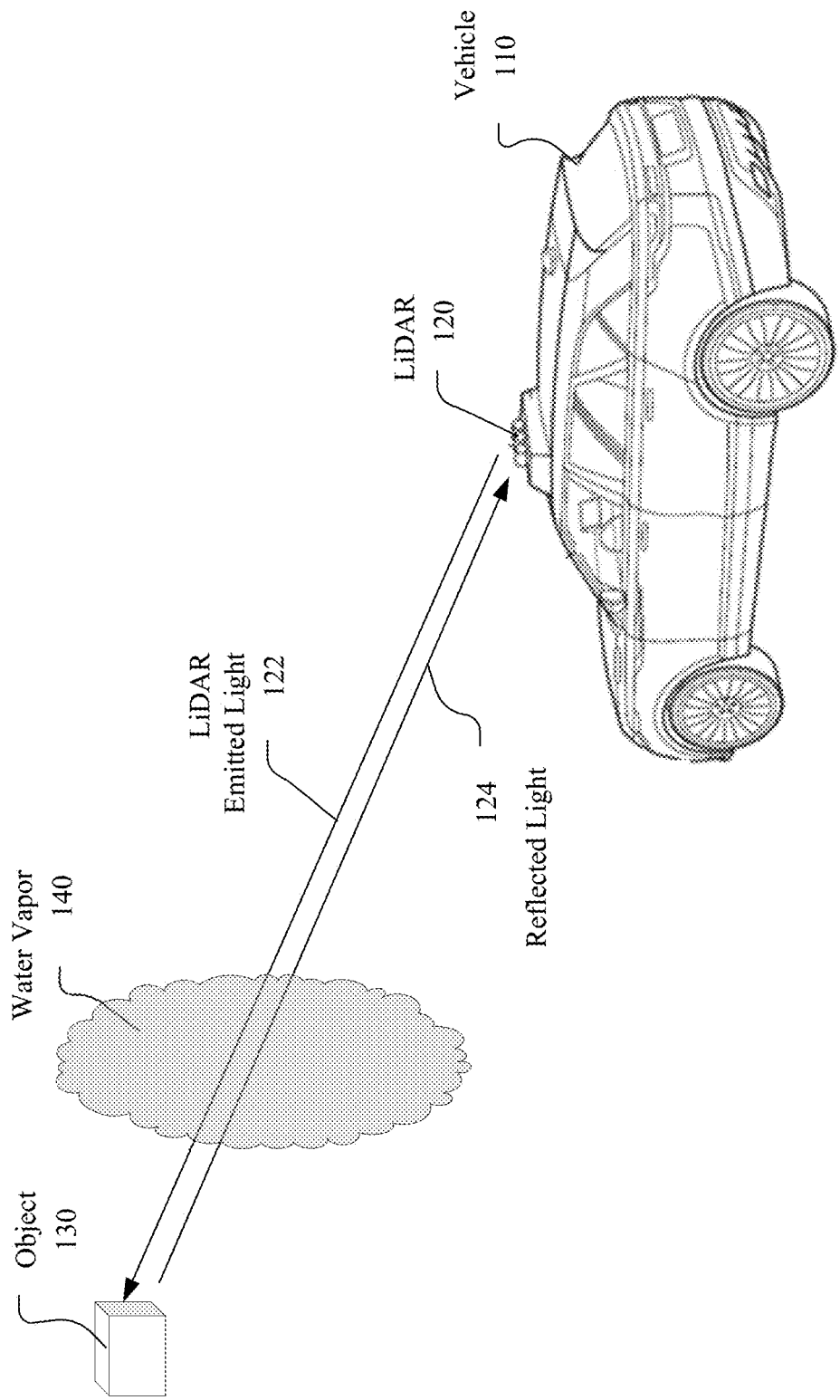
FIG. 1 illustrates the humidity influence on the performance of a LiDAR system.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

LiDAR systems may be used by autonomous vehicles (AVs) or non-autonomous vehicles for mapping or profiling the surrounding environment. The LiDAR system may flash a laser beam to an object in the environment and measure the time of flight for the reflected light to return. However, different environmental conditions may negatively impact the performance of the LiDAR system. A given environmental condition may have a variety of characteristics that affect the performance of the LiDAR system. Such characteristics may, for example, depend on the aerosol particles present in the atmosphere. Different types of particles may have different concentration, particle size, particle shape, refractive index, absorption index, and other characteristics that could influence the performance of LiDAR systems. The extent of a particle's influence often depends on the wavelength of the light. As an example, when the environment is humid, the emitted and reflected light may be absorbed by the water vapor in the air and the LiDAR system may have dramatically reduced signal-to-noise ratio (SNR). The reduced SNR may negatively impact the measurement accuracy and confidence level of the LiDAR system which may lead to less safe operations for vehicles that rely on LiDAR systems.

In order to eliminate or minimize the negative impacts from environmental conditions, particular embodiments of the LiDAR system may adaptively select different operation modes for transmitting light beams of different wavelengths based on the environmental conditions. The embodiments described herein enable a LiDAR system to adaptively select operational modes for transmitting light beams of different wavelengths to optimize the LiDAR's performance under the present environmental conditions. For example, when the environment is humid, the LiDAR system may select a first operation mode which allows the light emitters to be configured to simultaneously emit light beams of different wavelengths to increase the measurement confidence level. As another example, when the environment is in a normal condition (e.g., not humid, no fog, no exhaust plume, etc.), the LiDAR system may select a second operation mode which allows the light emitters to be configured to sequentially emit light beams of different wavelengths to increase the spatial resolution of the measurement.

By adaptively selecting operational modes based on environmental conditions, particular embodiments of the LiDAR system eliminate or minimize environmental impacts on the measurement results and provide more accurate measurement than traditional LiDAR systems. For example, particular embodiments of the LiDAR system may provide better SNR across varying environmental conditions, thereby improving the safety of vehicles. For vehicles relying on multiple measurement channels (e.g., LiDAR, cameras, radars, etc.) to support robust operational decisions, particular embodiments of the LiDAR system provide such alternative measurement channels by operating on different operation modes with different wavelength ranges, and therefore improve the confidence level of the measurement and decisions made by the vehicles. Another feature of the LiDAR embodiments described herein pertains to eye safety. The LiDAR-emitted laser may cause eyes safety concern for the people around. Particular embodiments of the LiDAR system are safer to human eyes by minimizing the required power and/or emission duration in the emitted light and optimizing the light power among multiple wavelength ranges. The systems and method described in this disclosure may be applicable to, for example, autonomous vehicles, manually-driven vehicles, computer-assisted driven vehicles, hybrid-driven vehicles, or any suitable vehicles, etc.

The atmosphere of the earth has a variety of components (e.g., oxygen and water vapor) which absorb light in particular wavelengths. The oxygen ($O_2$) density in the atmosphere is about 20% and is generally stable while the amount of water vapor in the air can change dramatically. Oxygen ($O_2$) may absorb light with wavelengths around 760 nm and water vapor ($H_2O$) may absorb light with wavelengths around 850 nm and 940 nm. The solar light near the earth surface may have relative lower intensity around the wavelengths of 760 nm, 850 nm, and 940 nm because of the absorption by oxygen and water vapor in the air.

Solar light, which may be the background light and dominant noise factor for LiDAR systems, once captured by a LiDAR's light detector may saturate the light detector or at least reduce the SNR of the detected light signals. Particular embodiments of the system may emitting lasers in wavelengths that correspond to the common atmospheric absorption wavelengths to minimize the influence of solar light. For example, particular embodiments of the LiDAR system may emit light and have light detectors or cameras (e.g., CMOS or CCD) operate in the wavelength ranges around 760 nm, 850 nm, 905 nm, 940 nm, or/and 1550 nm since there is typically less solar light in those wavelength ranges due to absorption by water vapor in the atmosphere. For light detectors operating at these wavelength ranges, the light absorption by water vapor in the atmosphere may help to reduce the noise introduced by the background solar light. However, when the environment is humid, the LiDAR system operating at these wavelength ranges may have suboptimal SNR because both the emitted light by LiDAR and the reflected light by the object will be partially absorbed by the water vapor in the air. The reduced SNR may negatively impact the measurement accuracy and confidence level of the LiDAR system.

FIG. 1 illustrates a vehicle 110 using a LiDAR system 120 for mapping or profiling the environment. The vehicle 110 may be an autonomous vehicle (AV), a non-autonomous vehicle (e.g., with assisted driving system or mapping system), manually-driven vehicles, computer-assisted driven vehicles, hybrid-driven vehicles, or any suitable vehicles. The LiDAR system 120 may emit a light beam 122 to an object 130 in the environment. The LiDAR system 120 may measure the time taken by the emitted light 122 to reach the object 130 and the time taken by the reflected light 124 to fly back to LiDAR system to measure the distance between the LiDAR system 120 and the object 130. When the environment is humid, the emitted light 122 and the reflected light 124 may be absorbed by the water vapor 140 (or any other type of aerosol particles, such as carbon) in the air and the two-way absorption may cause the LiDAR system 120 to have dramatically reduced SNR. As an example and not by way of limitation, the vehicle 110 using the LiDAR system 120 may drive at a place with the temperature of 23° C. and the relative humidity of 20%. When the relative humidity changes from 20% to 80% under the same temperature, the LiDAR system 120 may have its SNR reduced by a factor of four. The reduced SNR may negatively impact the measurement accuracy of the LiDAR system 120 and lead to less safe operations for the vehicle 110 which may rely on the LiDAR system 120.

LiDAR systems may use lasers in the wavelengths around 760 nm, 850 nm, 905 nm, 940 nm, or/and 1550 nm because of the availability of laser sources and light detectors and the need to reduce atmospheric background light. As discussed above, there is typically lower levels of solar background light in the wavelength ranges around 850 nm, 905 nm or 940 nm due to the absorption of light by water vapor in the atmosphere. However, when the surrounding environment is humid, the two-way absorption of the laser light by the water vapor in the air in the wavelength ranges around the 850 nm, 905 nm, or 940 nm may seriously reduce the SNR of the LiDAR system. As an example and not by way of limitation, the LiDAR system may operate under the following conditions:

| | |
|---|---|
| Temperature | 20° C. |
| Water Vapor Saturation Density | 17.3 g/m² (at 20° C.) |
| Water Vapor Molar Mass | 18.02 g/mol |
| Relative Humidity (RH) | 20% and 80% |
| Avogadro Number $N_A$ | 6.022e17 |
| Water Vapor Absorption Cross Section | σ(934 nm) = 5.23e−22 (cm⁻²/molec) |
| Distance to Target R | 40 meters |

The SNR of the LiDAR system may be determined by the signal power $N_S$ and the background light power $N_B$, and other components contributing to the background noise including $N_T$, $N_{SH}$ and $N_D$ using the following equations (1), (2) and (3):

$$SNR = \frac{N_S}{N_B + N_T + N_{SH} + N_D} \quad (1)$$

The scattering and absorption of light can be described by the following equations:

$$N_S(\lambda, r) = \frac{P_L(\lambda)\Delta t}{hc/\lambda}[\beta(\lambda, r)]\frac{A}{r^2}T(\lambda, r)v(\lambda)G(r) + N_B \quad (2)$$

$$T(\lambda, r) = \exp\left[-2\int_0^r a(\lambda, r)dr\right] \quad (3)$$

wherein, $\alpha=\alpha_{abs}+\alpha_{ac}$. The scattering event may be primarily driven by aerosols and, as a result, the scattering may not be changed much by the humidity level. Using the above equations and conditions, it can be determined that the water vapor molecular density for 20% relative humidity equals to 1.156e17 molec/cm$^3$ and the water vapor molecular density for 80% relative humidity equals to 4.625e17 molec/cm$^3$. Correspondingly, it can be determined that the detected signal strength under 20% relative humidity is 4.16 times of the signal strength under 80% relative humidity. Therefore, under these conditions, the SNR of the LiDAR system may be reduced by a factor of 4.16 when the relative humidity changes from 20% to 80%. The laser signal, as well as any background light, may be weakened due to the absorption by water vapor. However, the background light may be a one-way transmission while the absorption effect on the laser could be a two-way (round-trip) absorption effect. As can been from the above equations, the SNR may be directly affected by $N_S$ while $N_B$ may be one noise factor among a variety of noise factors. As a result, operating in water vapor-absorption wavelength windows (e.g., 850 nm, 905 nm, and 940 nm) may result in a variable LiDAR performance as a function of humidity. The performance of the LiDAR system can be negatively impacted by the amount of water vapor in the air. In particular embodiments, the system may quantitively calculate and measure the environmental impact of different environmental conditions (e.g., rain, fog, smog, exhaust plume, dust, etc.) on the performance of the LiDAR system taking advantage of the return power being a function of the transmitted power (which is a function of the wavelength) and the pulse time variation (which depends on the type of laser).

Figure 2A:
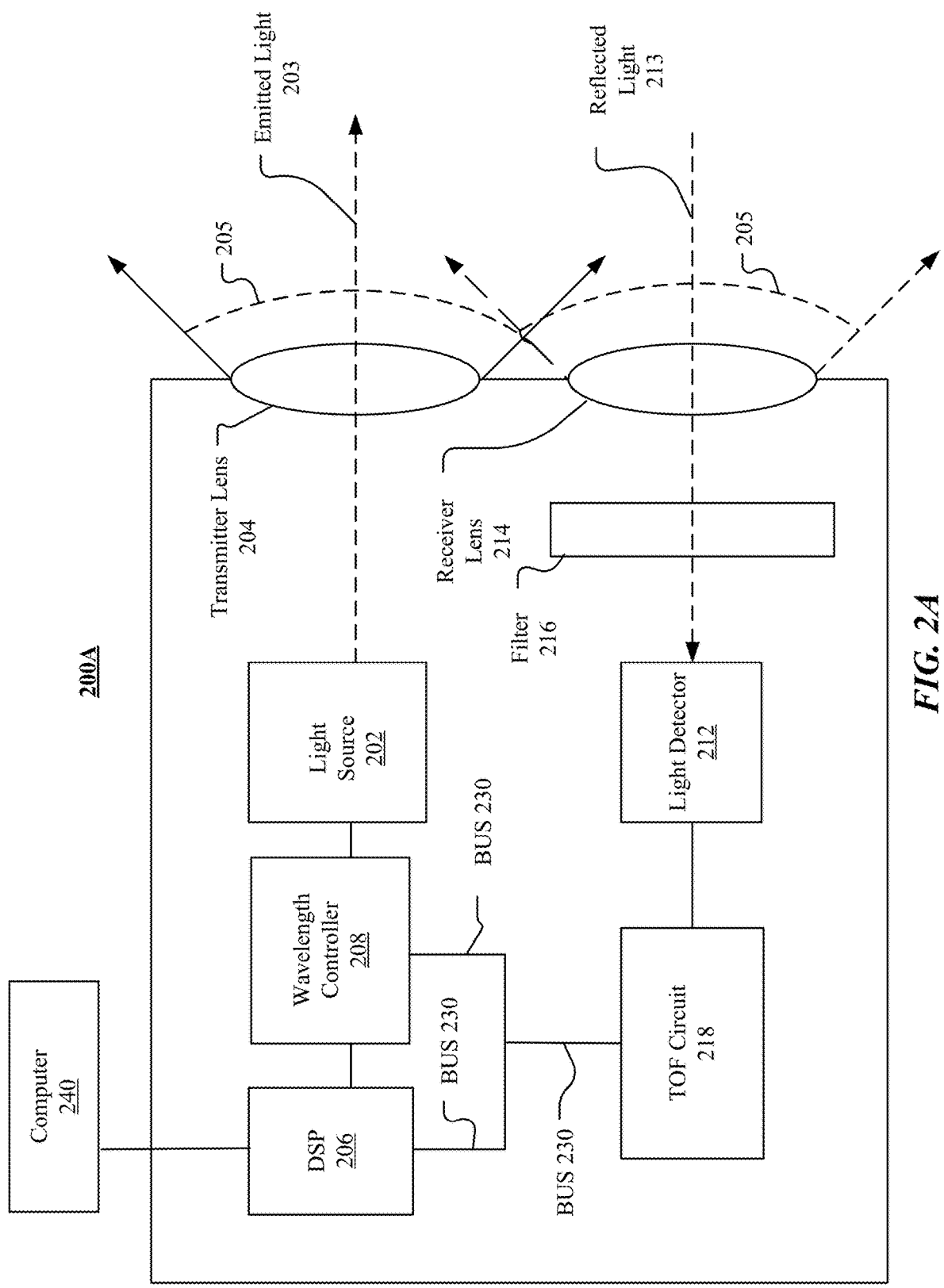
FIG. 2A illustrates an example adaptive LiDAR system.

FIG. 2A illustrates an example adaptive LiDAR system 200A. In particular embodiments, the LiDAR system 200A may include a light source 202, a transmitter lens 204, a light detector 212, a filter 216, a receiver lens 214, a time of flight (TOF) circuit 218, a digital signal processor (DSP) 206, a wavelength controller 208, a computer 240, etc. In particular embodiments, the light source 202 may include one or more light emitters. As an example and not by way of limitation, the light source 202 may be a single light emitter, for example, a light emitting diode, a vertical-cavity surface-emitting laser (VCSEL), or other types of laser diode. In particular embodiments, the light emitter(s) of the light source 202 may be or include a tunable light emitter which can tune its laser signal to different wavelength ranges and different power levels. As another example, the light source 202 may include a number of light emitters in a one-dimensional array. As another example, the light source 202 may include a number of light emitters in a two-dimensional array.

In particular embodiments, the light source 202 may emit laser or light beams of different wavelengths in the range of, for example, but not limited to, 760 nm±5 nm, 850 nm±5 nm, 905 nm±5 nm, 940 nm±5 nm, 1550 nm±5 nm, etc. The wavelengths of the light beams may be described by a center wavelength (e.g., 760 nm, 850 nm, 905 nm, 940 nm, 1550 nm, etc.) and a deviation range (e.g., ±5 nm, ±10 nm, ±15 nm, etc.). It is notable that the center wavelengths and deviation ranges as described here are for example purpose and the light beam wavelength ranges can have any suitable center wavelengths and any suitable deviation ranges and are not limited thereof. In particular embodiments, a light emitter of the light source 202 may be optimized to operate in a particular wavelength range (e.g., $\lambda_1$±5 nm) and can keep the emitted light stable in that wavelength range. When the light source 202 includes multiple light emitters, the light source 202 may split the total power among the light emitters which emit light in different wavelength ranges to keep the laser power under the safety threshold. As an example and not by way of limitation, the light source 202 may emit light beams in three wavelength ranges of 760 nm±nm, 850 nm±5 nm, and 940 nm±5 nm, which may have 20%, 30%, and 50% of the total power, respectively. As another example, the light source 202 may emit light beams in four wavelength ranges of 760 nm±5 nm, 850 nm±5 nm, 905 nm±5 nm, and 940 nm±5 nm, which may have 10%, 20%, 20%, and 50% of the total power, respectively. As another example, the light source 202 may emit light beams in five wavelength ranges of 760 nm±5 nm, 850 nm±5 nm, 905 nm±5 nm, 940 nm±5 nm, and 1550 nm±5 nm which may each have 20% of the total power, respectively. It is notable that the power distributions on different wavelength ranges as described here are for example purpose and the power distribution and the wavelength ranges are not limited thereof.

In particular embodiments, the wavelength controller 208 may control the light source 202 to emit light beams of different wavelengths. The light source 202 may transmit the emitted light 203 through the transmitter lens 204 to the surrounding environment. The transmitter lens 204 and the receiver lens 214 may have the same or substantially overlapping field of view 205. The reflected light 213 may pass through the receiver lens 214 and the filter 216 to reach the light detector 212. The filter 216 may be a multi-bandpass filter which allows the light in particular wavelength ranges to pass and blocks the light in other wavelength ranges. In particular embodiments, the light detector 212 may include one or more light detection elements. As an example and not by way of limitation, the light detector 212 may include a single photodiode which can detect reflected light beams of different wavelengths. As another example, the light detector 212 may include an array of photodiodes (e.g., 1D array or 2D array) for detecting reflected light beams of different wavelengths. Each photodiode may detect light beams of one or multiple wavelength ranges and may have different sensitivity for different wavelength ranges. As another example, the light detector 212 may be or include a CMOS camera or CCD camera having an array of pixels with each pixel measuring intensity of the light captured by that pixel.

In particular embodiments, the TOF circuit 218 may coordinate with the wavelength controller 208 through the bus 230 to determine the time when the emitted light 203 is emitted. The TOF circuit 218 may coordinate with the light detector 212 to determine the time when the reflected light 213 reaches the light detector 212. In particular embodiments, the TOF circuit 218 may use a TOF sensor to determine the receipt time of the reflected light 213. The DSP 206 may receive the time information from the wavelength controller 208 and the TOF circuit 218 and calculate the distance between the LiDAR system 200A and the object which reflects the reflected light 213. In particular embodiments, the DSP 206 may determine the testing and switching logic for selecting different operation modes to allow the LiDAR system to have the best performance. The time information, the calculated distance and other measurement data may be sent to the computer 240 for further analyzing and processing. The computer 240 may be associated with a perception system which may construct a 3D model of the objects in the surrounding environment or/and a 3D profile for the perception of the surrounding environment itself. In particular embodiments, the outputs of TOF circuit 218 may be sent to the perception system as a factor for determining the confidence level of the perception system outputs. In particular embodiments, the light detector 212 and the TOF circuit 218 may be included in a TOF camera.

Figure 2B:
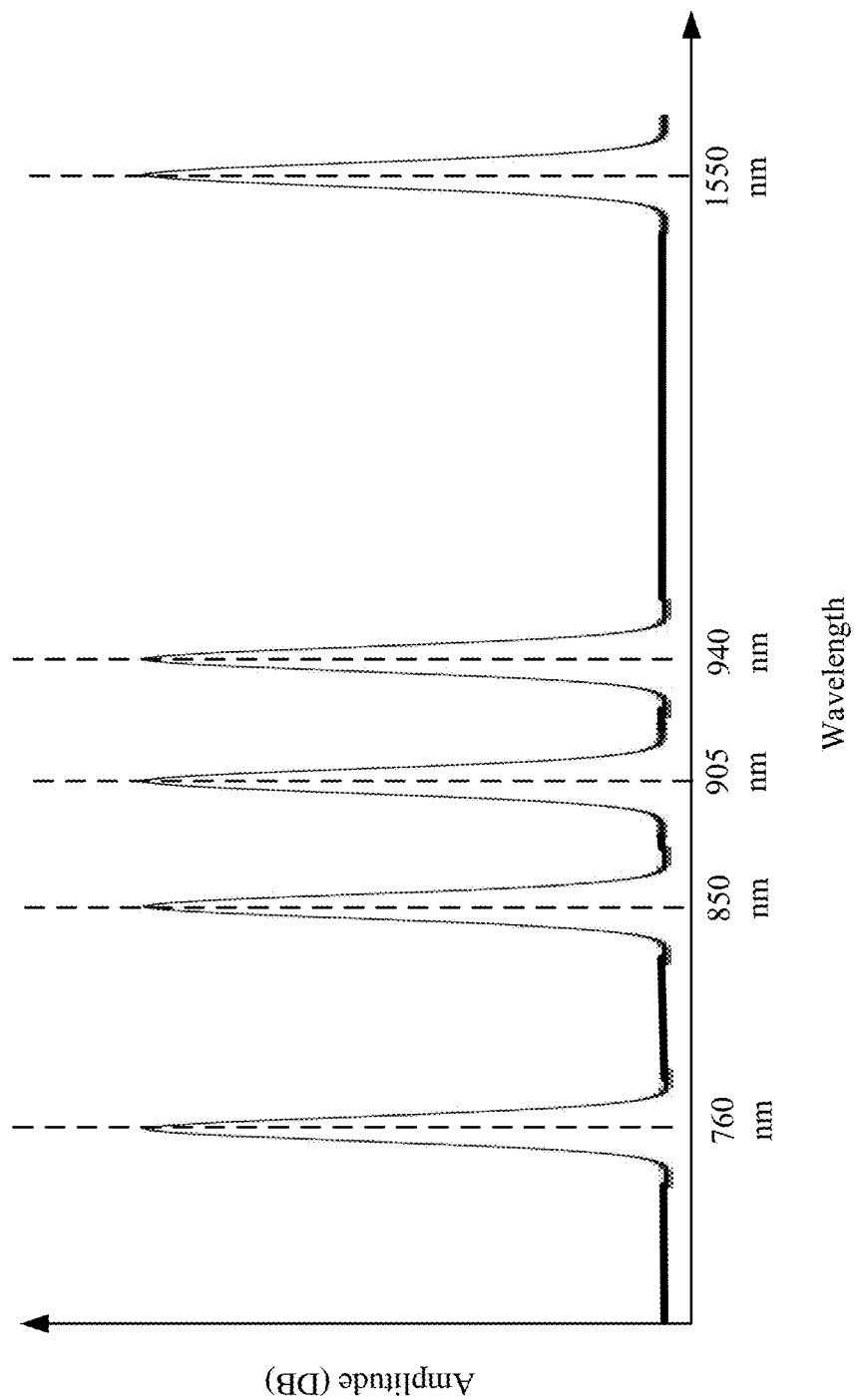
FIG. 2B illustrates an example magnitude transfer function for the multi-bandpass filter of the LiDAR system.

FIG. 2B illustrates an example magnitude transfer function 200B for the multi-bandpass filter 216 of the LiDAR system 200A. In this example, the filter 216 may have five passing bands which are centered at 760 nm, 850 nm, 905 nm, 940 nm, and 1150 nm, respectively. It is notable that these wavelengths are for example purpose and the wavelengths can be any suitable wavelengths and are not limited thereof. The wavelength ranges of the filter passing bands may be any wavelength ranges that are supported by the light source 202. The multi-bandpass filter 216 may pass some background light to the light detector 212 by allowing light in all passing bands to pass. For example, when LiDAR system is emitting light beams in the wavelength range of 760 nm±5 nm, the light in other wavelength ranges (e.g., solar light or other light sources) of 850 nm±5 nm, 905 nm±5 nm, 940 nm±5 nm, or/and 1550 nm±5 nm may pass the filter 216 and reach the light detector 212 as background noise. The LiDAR system 200A may measure the background noise level before emitting the light beams and use the measured background noise to determine and improve the SNR of the measurement.

In particular embodiments, the adaptive LiDAR system may have different components for light detection channel. As an example and no by way of limitation, the LiDAR system may include multiple light detectors, multiple dichroic mirrors, and multiple dichroic filters instead of one multi-pass filter and one light detector. Each dichroic mirror may reflect a portion of the reflected light to a corresponding light detector and each dichroic filter may allow light in a particular wavelength range to pass while blocking light in other wavelength ranges. For example, the dichroic filters may have the passing bands of 760 nm±5 nm, 850 nm±5 nm, 940±5 nm, and 1550±5 nm, respectively. The light in the corresponding wavelength ranges of 760 nm±5 nm, 850 nm±5 nm, 940±5 nm, and 1550±5 nm may reach the respective light detectors. By using the filter with single passing band for each light detector, the LiDAR system may reduce the background noise by filtering out light in other wavelength ranges beyond the passing band of the filter. The light detector 212 may include multiple light detectors which are optimized for the corresponding wavelength ranges.

Figure 3A:
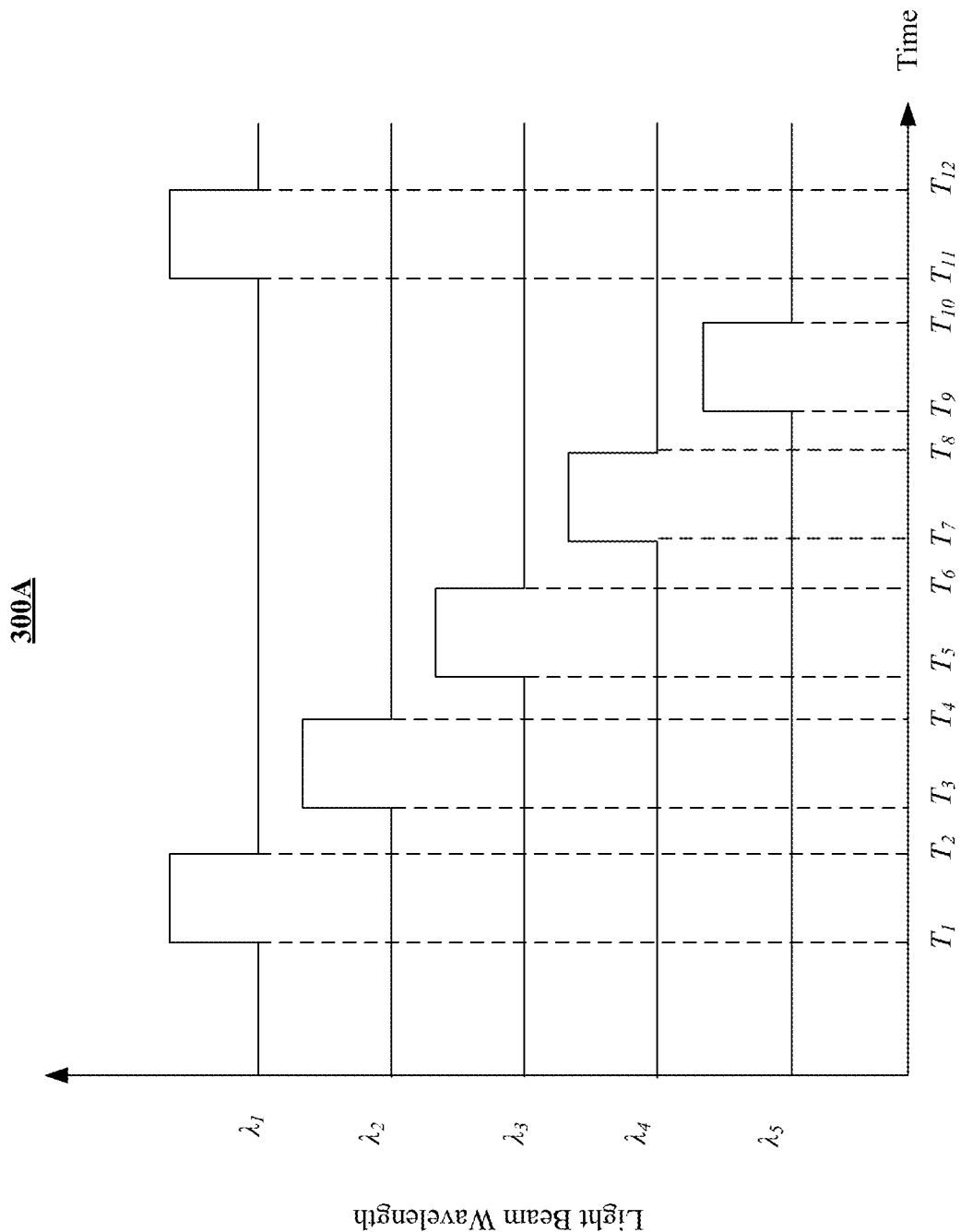
FIG. 3A illustrates an example time sequence for sequentially transmitting light beams of different wavelengths.

FIG. 3A illustrates an example time sequence 300A for sequentially transmitting light beams of different wavelengths. In particular embodiments, the system may transmit light beams of different wavelengths in a sequential manner into the surrounding environment for measuring distances to objects in the surrounding environment. For a LiDAR system relaying on light beam of a single wavelength range, the LiDAR system may emit light beam pulses along the time domain. For example, the LiDAR system may periodically emit light beam of wavelength $\lambda_1$ during the time periods of $[T_1, T_2]$, $[T_{11}, T_{12}]$ and so on, and measure distances to one or more objects in the surrounding environment based on the reflections of the emitted light beams. The emitted light beams may be projected into the surrounding environment at different directions (e.g., during a scanning process) to profile the space or objects. For example, the light beam emitted during the time period of $[T_1, T_2]$ may be projected at a first direction and the light beam emitted during the time period of $[T_{11}, T_{12}]$ may be projected at a second direction. The time interval between the time periods of $[T_1, T_2]$ and $[T_{11}, T_{12}]$ may correspond to a spatial resolution of the scanning process using the light beam of a single wavelength $\lambda_1$. The transmitting time periods of $[T_1, T_2]$ and $[T_{11},$ $T_{12}]$ may have fixed time interval (e.g., from $T_2$ to $T_{11}$) which may be predetermined for the scanning process or may have a variable time interval depending on the spatial resolution requirement of the scanning process.

In particular embodiments, for the LiDAR system using multiple wavelengths, the system may configure one or more light emitters to emit light beams of different wavelengths sequentially along the time domain. As an example and not by way of limitation, the system may configure one or more light emitters to emit light beams of wavelengths of $\lambda_1, \lambda_2, \lambda_3, \lambda_4,$ and $\lambda_5$ during the time periods of $[T_1, T_2]$, $[T_3, T_4]$, $[T_5, T_6]$, $[T_7, T_8]$, and $[T_9, T_{10}]$, respectively. The emitted light beams of different wavelengths may be projected into the surrounding environment at different directions (e.g., using a scanning process) to scan and profile the 3D space or objects of the surrounding environment. Comparing to the LiDAR system which periodically emits light beam of a single wavelength with a fixed period interval (e.g., the time interval between $[T_1, T_2]$ and $[T_{11}, T_{12}]$), the LiDAR system that emits light beams of different wavelengths sequentially along the time domain may provide higher spatial resolution for the scanning or profiling process of the 3D space or objects of the surrounding environment. For example, the light beams emitted during the time period of $[T_3, T_4]$, $[T_5, T_6]$, $[T_7, T_8]$, and $[T_9, T_{10}]$ may provide additional measurement points for the scanning or profiling process. It is notable that the five wavelengths and five transmitting time periods as described here are for example purpose and the number of wavelength ranges can be any suitable number and is not limited thereof. It is notable that the time periods for emitting light beams of different wavelengths may be evenly distributed along the time domain or un-evenly distributed along the time domain based on the measurement needs. It is notable that the time periods for emitting light beams of different wavelengths are not overlapping in this example. However, the time periods for emitting light beams of different wavelengths could be partially overlapping or totally overlapping, as will be described in later sections of this disclosure.

FIG. 3B illustrates an example time sequence 300B with partially overlapping transmitting time periods for sequentially transmitting light beams of different wavelengths. In particular embodiments, the system may configure one or more light emitters to emit or transmit light beams of different wavelengths sequentially in the time domain with partially overlapping transmitting time periods for different wavelengths. As an example and not by way of limitation, the system may transmit light beams of different wavelengths of $\lambda_1, \lambda_2, \lambda_3, \lambda_4,$ and $\lambda_5$ during the time periods of $[T_1, T_2]$ $[T_3, T_4]$, $[T_5, T_6]$, $[T_7, T_8]$, and $[T_9, T_{10}]$, respectively. The transmitting time periods for different wavelengths may be partially overlapping. For example, the transmitting time periods of $[T_3, T_4]$, $[T_5, T_6]$, $[T_7, T_8]$, and $[T_9, T_{10}]$, may overlap with $[T_1, T_2]$, $[T_3, T_4]$, $[T_5, T_6]$, and $[T_7, T_8]$, respectively. The light beams of different wavelengths may be projected into the surrounding environment at different directions during a scanning process. Similar to the operational mode as illustrated in FIG. 3A, comparing to the LiDAR system which periodically emits light beam of a single wavelength with a fixed period interval (e.g., the interval between the time periods of $[T_1, T_2]$ and $[T_{11}, T_{12}]$), the LiDAR system that emits light beams of different wavelengths sequentially along the time domain may provide higher spatial resolution for scanning or profiling the 3D space or objects of the surrounding environment. For example, the light beams emitted during the time period of $[T_3, T_4]$, $[T_5, T_6]$, $[T_7, T_8]$, and $[T_9, T_{10}]$ may provide additional measurement points for the scanning or profiling process. In particular embodiments, the system may use overlapping transmitting time periods to have longer transmitting time period durations (e.g., from $T_1$ to $T_2$ or from $T_3$ to $T_4$) for each wavelength. In particular embodiments, the system may use overlapping transmitting time periods to accommodate more transmitting time periods of multiple wavelengths within a fixed time period interval of a single wavelength (e.g., from $T_2$ to $T_{11}$). It is notable that the time periods for transmitting light beams of different wavelengths may be evenly distributed along the time domain or may be un-evenly distributed along the time domain based on the measurement needs.

Figure 3C:
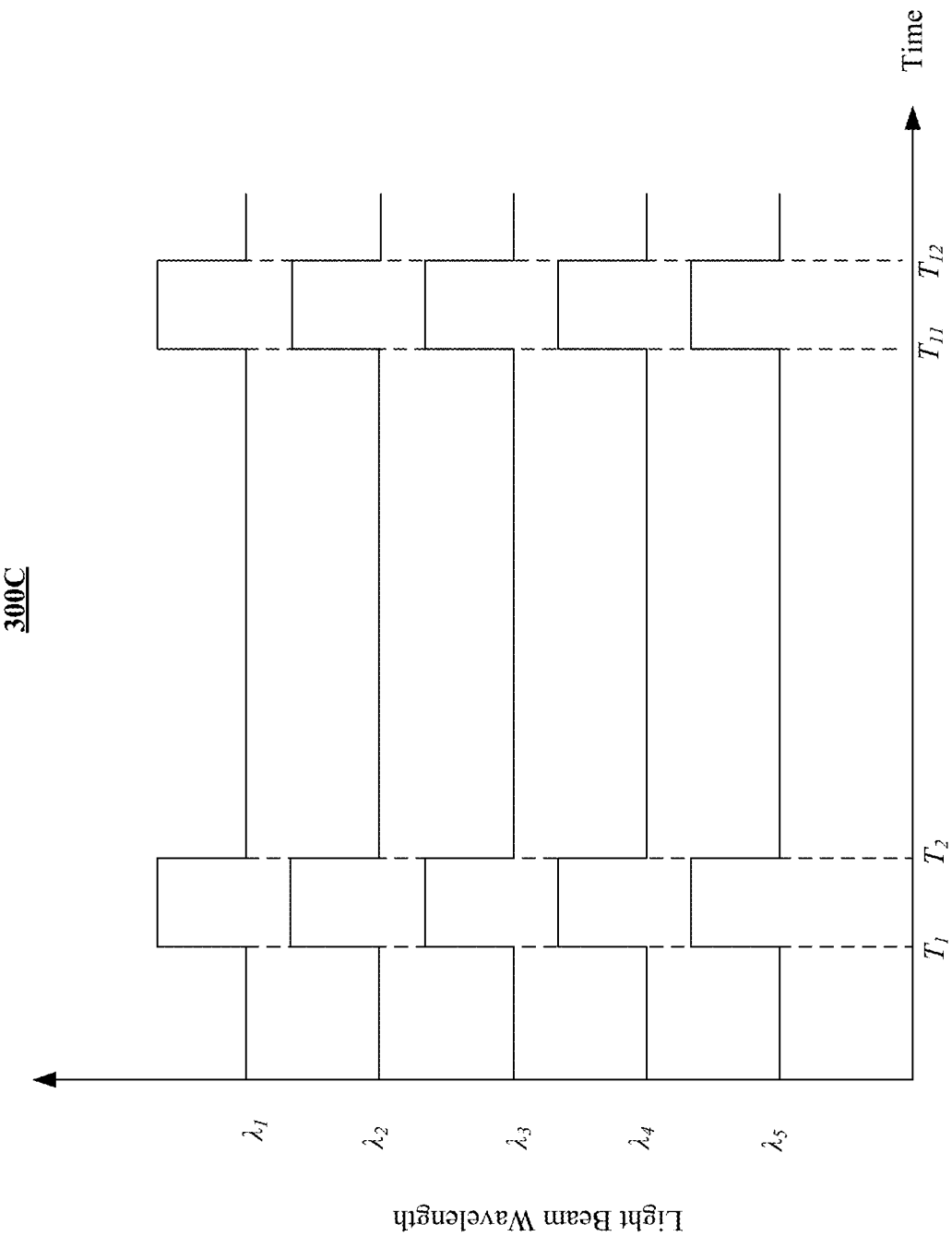
FIG. 3C illustrates an example time sequence for simultaneously transmitting light beams of different wavelengths.

FIG. 3C illustrates an example time sequence 300C for simultaneously transmitting light beams of different wavelengths. In particular embodiments, the system may configure one or more light emitters of the light source to transmit light beams of different wavelengths simultaneously. As an example and not by way of limitation, as shown in FIG. 3C, the system may configure the light emitters to transmit light beams of different wavelengths of $\lambda_1$, $\lambda_2$, $\lambda_3$, $\lambda_4$, and $\lambda_5$ simultaneously during the time periods of $[T_1, T_2]$. The light beams of different wavelengths may be transmitted periodically (e.g., during the time period of $[T_1, T_2]$, $[T_{11}, T_{12}]$, and so on). The transmitting time periods may have fixed time interval (e.g., from $T_2$ to $T_{11}$) predetermined for the scanning process or may have a variable time interval depending on the spatial resolution requirement of the scanning process.

During the scanning process, the light beams emitted during different time periods may be projected into the surrounding environment at different directions. However, the light beams of different wavelengths that are emitted during the same time period (e.g., $[T_1, T_2]$ or $[T_1, T_{12}]$) may be projected at the same direction into the surrounding environment. The system may measure distances to one or more objects in the surrounding environment based on reflections of the light beams. The light beams of different wavelengths that are projected at the same direction may hit the same object and may be reflected by the same object. Consequently, the reflected light beams of different wavelengths may have the same time of flight to reach the object and return to the light detector. Therefore, the system may measure the same distance using light beams of multiple wavelengths (e.g., $\lambda_1$, $\lambda_2$, $\lambda_3$, $\lambda_4$, $\lambda_5$) and may have a higher confidence level for the distance measurement than using a single wavelength because of the measurement redundancy. For example, when the reflected light signal of a particular wavelength has a reduced SNR (e.g., being below a SNR threshold) or a low amplitude (e.g., being below an amplitude threshold) that negatively impacts the measurement accuracy or confidence level, the system may use the reflected light signals of one or more other wavelengths to verify the measurement result. The system may use the measurements based on two or more wavelengths to vote for more reliable and accurate measurement results and improve the accuracy and confidence level of the measurement. Furthermore, the system may compare the responses (e.g., amplitudes of reflected light signals, SNR, confidence level, etc.) of the reflected light signals of different wavelengths to characterize the surrounding environment and select different operation modes for different environment conditions, as will be described in the later sections of this disclosure.

Figure 3D:
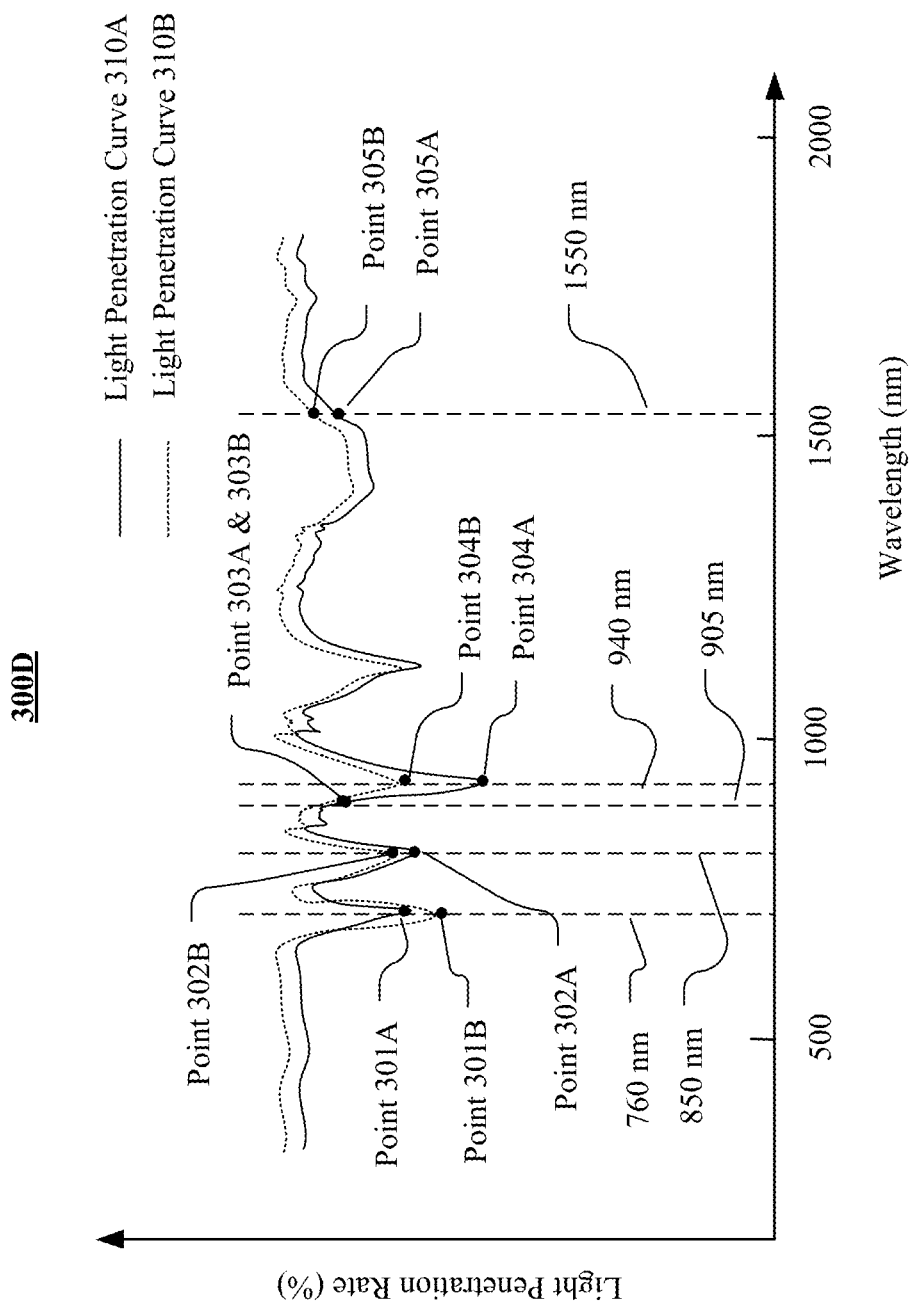
FIG. 3D illustrates two example light penetration curves under different environmental conditions.

FIG. 3D illustrates example light penetration curves 310A-B under different environmental conditions. In particular embodiments, the system may determine one or more characteristics of the surrounding environment based on the reflections of the light beams of different wavelengths. The system may configure one or more light emitters to transmit light beams of different wavelengths simultaneously into the surrounding environment (e.g., as shown in FIG. 3C) and measure the reflected light signals of different wavelengths. The system may compare the one or more parameters of the reflected light signals of different wavelengths to determine the characteristics of the surrounding environment. The characteristic of the surrounding environment may be described by a light penetration curve which may represent light penetration rates on different wavelengths. The light penetration rate may be determined by the percentage of power or light intensity of the reflected light, as captured by the light detector after the two-way flight penetrating the surrounding environment, over the power of the light emitted by the light source. The light penetration rate may depend on a light absorption rate or/and a light scattering rate of the surrounding environment. In general, the light absorption rate may correspond to the humidity of the surrounding environment while the light scattering absorption rate may correspond to the density of other particles in air that scatters the light passing through.

In particular embodiments, the system may determine a light penetration characteristic (e.g., a light penetration curve, light penetration rates at different wavelengths, light penetration signature, etc.) which may include a light absorption characteristic (e.g., light absorption curve, light absorption rates at different wavelengths, light absorption signatures, etc.) or/and a light scattering characteristic (e.g., light scattering curve, light scattering rates at different wavelengths, light scattering signatures, etc.). In particular embodiments, the system may compare the amplitudes or SNRs of the reflected light signals to determine the light penetration rates of the surrounding environment at different wavelengths. The system may determine a light penetration characteristic of the surrounding environment based on the penetration rates of different wavelengths. The light penetration characteristic may be associated with a characteristic signature which is associated with an environmental condition (e.g., raining, fog, smog, dust, exhaust plume, clear weather, etc.).

In particular embodiments, the system may determine the characteristic of the surrounding environment by determining and comparing the penetration rates (e.g., including absorption rates or/and scattering rates) of different wavelengths. The characteristic signatures associated with different environmental conditions may be associated with different combination of penetration rate values (including absorption rate values or/and scattering rate values) at different wavelengths. As an example and not by way of limitation, the light penetration curves 310A and 310B may correspond to a first environmental condition and a second environmental condition, respectively. In the first environmental condition, the light penetration rates at the five wavelengths of 760 nm, 850 nm, 904 nm, 940 nm, and 1550 nm, which correspond to the points of 301A, 302A, 303A, 304A, and 305A, respectively, may in total correspond to a light penetration signature associated with the first environment condition. In the second environmental condition, the light penetration rates at the five wavelengths of 760 nm, 850 nm, 904 nm, 940 nm, and 1550 nm, which correspond to the points of 301B, 302B, 303B, 304B, and 305B, respectively, may in total correspond to a light penetration signature associated with the second environment condition. The system may determine the characteristic of the current surrounding environment and compare the current characteristic to a number of characteristic signatures stored in a database to identify the current environment condition based on the comparison.

As an example and not by way of limitation, when the characteristic matches a signature associated with raining weather, the system may identify that there is a raining weather condition in the surrounding environment. As another example, when the characteristic matches a signature associated with a clear weather, the system may identify that the surrounding environment has a clear weather condition. As another example, when the characteristic matches a signature associated with exhaust plume, the system may identify the existence of the exhaust plume in the surrounding environment. It is notable that the characteristic signatures as described here are for example purpose and are not limited thereof. For example, a characteristic signature may be based on any combination of any number of penetration rate values at any suitable wavelengths. As another example, the characteristic signature may include a trend (e.g., increasing trends, decreasing trends, fluctuation trends, etc.), a pattern (e.g., as described by absolute values and relative relations of the penetration rate of different wavelength), a change (e.g., changing slopes), or any recognizable feature (e.g., features recognizable by algorithms such machine-learning models) associated with the penetration curves or associated with one or more penetration rates of different wavelengths.

In particular embodiments, the system may adaptively select different operation modes (e.g., as illustrated in FIGS. 3A-C) based on different environmental conditions. In particular embodiments, the system may determine a characteristic baseline associated with an environmental baseline status. The characteristic baseline may be associated with a reference environmental condition (e.g., clear weather) with a combination of baseline parameter values (e.g., temperature, pressure, elevation, humidity, etc.). Under this reference environmental condition, the system may operate at a first operation mode (e.g., shown in FIG. 3A) in which the light emitters are configured to emit light beams of different wavelengths sequentially to provide higher spatial resolution for scanning or profiling the surrounding environment. When operating in the first operation mode, the system may detect, receive, or determine a change in one or more environmental factors. The system may determine whether the change of the one or more environmental factors satisfies a criterion (e.g., a threshold change) and switch to a second operation mode (e.g., in shown in FIG. 3C) to characterize the surrounding environment when the change satisfies the criterion (e.g., being above the threshold change). The system may determine which operation modes to select under current environmental conditions (e.g., whether to configure the one or more light emitters to transmit light beams of different wavelengths simultaneously or sequentially for measuring distances to the one or more objects in the surrounding environment) based on the characteristic of the surrounding environment. In particular embodiments, the system may direct to select another operation mode when the change satisfies the criterion (e.g., being above the threshold change).

In particular embodiments, the environmental factors may include, for example, but are not limited to, environmental humidity, environmental temperature, atmosphere pressure, a raining weather condition, a sunny weather condition, a cloudy weather condition, a foggy weather condition, a road condition, a number of obstacles in the surrounding environment, a nearby lake, a nearby spring, a sprinkler truck, a solar light intensity, an exhaust plume, a dust cloud, a particle density in air, etc. In particular embodiments, the one or more environmental factors may be determined based on, for example, but not limited to, a sensor associated with the computing system, a sensor fusion result, a data process result, a communication from a second computing system, a current location, a navigation map, a weather forecast, a user operation, a user input, etc.

As an example and not by way of limitation, the system may characterize the surrounding environment and determine that there is a raining or fog weather condition based on the characteristic and switch to a second operation mode which allows the light beams of different wavelengths to be simultaneously emitted to improve the measurement confidence level. As another example, the system may determine, based on a navigation map and the current location (e.g., GPS coordinates), that there is a lake nearby and switch the to a second operation mode which allows the light beams of different wavelengths to be simultaneously emitted to improve the measurement confidence level. As another example, the system may detect, using a humidity sensor, that the surrounding environment is humid because of the raining or fog weather condition and switch to a second operation mode which allows the light beams of different wavelengths to be simultaneously emitted to improve the measurement confidence level. As another example, the system may determine, based on a weather forecast, that it is going to rain, and may switch to a second operation mode which allows the light beams of different wavelengths to be simultaneously emitted to improve the measurement confidence level. As another example, the system may receive a user input (e.g., turning on humid condition mode) or user operation (e.g., turning on wiper or defog system) and may switch to a second operation mode which allows the light beams of different wavelengths to be simultaneously emitted to improve the measurement confidence level.

In particular embodiments, when working a second operation mode (e.g., as shown in FIG. 3C), the system may have one or more light emitters configured to transmit light beams of different wavelengths simultaneously into the surrounding environment and measure the distances to one or more objects in the surrounding environment based on the reflections of the light beams. The system may determine a characteristic of the surrounding environment based on reflections of the light beams by determining and comparing the light penetration rates (including absorption rates or/and scattering rates) of the surrounding environment at different wavelengths. In response to a determinization that the characteristic of the surrounding environment satisfies a criterion (e.g., matching a characteristic baseline associated with the environmental baseline status), the system may switch the operation mode to configure the one or more light emitters to transmit light beams of different wavelengths sequentially into the surrounding environment for measuring distances to one or more objects in the surrounding environment. In response to a determination that the characteristic of the surrounding environment deviates from the characteristic baseline associated with the environmental baseline status for a threshold range, the system may continue to operation in the current operation mode (e.g., as shown in FIG. 3C) and measure the distances to the one or more objects in the surrounding environment based on the reflections of the light beams of different wavelengths that are simultaneously transmitted into the surrounding environment. The deviation or difference of the characteristic of the surrounding environment from the characteristic baseline may indicate that there are one or more environmental conditions (e.g., raining, fog, exhaust plume, dust, etc.) different from the reference environmental condition and there are needs for the system to operate in the second operation mode (e.g., as shown in FIG. 3C) to have a higher confidence level and accuracy for the measurement.

In particular embodiments, the system may adaptively select different operation modes (e.g., as illustrated in FIGS. 3A-C) based on one or more operational conditions of the system (which may indicate a change of the environmental conditions or a need to switch operation modes for other reasons). In particular embodiments, the system may determine that an operational condition of the computing system satisfies an operational criterion. In response the determination that the operational condition satisfies the operational criterion, the system may configure the one or more light emitters to transmit light beams of different wavelengths simultaneously into the surrounding environment to determine the characteristic of the surrounding environment. The system may determine whether to configure the one or more light emitters to transmit light beams of different wavelengths simultaneously or sequentially for measuring distances to the one or more objects in the surrounding environment based on the characteristic of the surrounding environment.

In particular embodiments, the system may monitor one or more operational conditions including, for example, but not limited to, a value of one or more performance metrics being below a threshold value, a deviation of one or more performance metrics from a reference value above a threshold range, a trend of one or more performance metrics satisfying a trend criterion, a time associated with a pre-determined schedule, a need to increase one or more performance aspects, a user operation input, etc. In particular embodiments, the system may measure and track one or more performance metrics including, for example, but not limited to, a measurement confidence level, a spatial measurement resolution, a signal-to-noise ratio (SNR), a measurement accuracy, a measurement precision, a noise level, a signal amplitude, a detectable field of view, a detectable distance, a detectable range, a signal degradation metric, etc. In particular embodiments, the distances to the one or more objects in the surrounding environment may be measured based on measurements related to, for example, but not limited to, a light intensity, a time-of-flight, a point-cloud pattern, a boundary of a dot pattern, a number of dots of a dot pattern, a light signal amplitude, a light signal phase, a light signal wavelength, etc.

As an example and not by way of limitation, the system may detect that a deviation of one or more performance metrics from a reference value is above a threshold range and the system performance is negatively impacted. The system may characterize the surrounding environment and switch to the corresponding operation modes based on the characteristic of the surrounding environment. As another example and not by way of limitation, the system may detect that a trend of one or more performance metrics satisfying a trend criterion (e.g., continuously decreasing SNR or signal amplitude) and the system performance is negatively impacted. The system may characterize the surrounding environment and switch to the corresponding operation modes based on the characteristic of the surrounding environment. As another example and not by way of limitation, the system may characterize the surrounding environment based on a pre-determined schedule and switch to the corresponding operation modes based on the characteristic of the surrounding environment. As another example and not by way of limitation, the system may determine that there is needs to improve the measurement confidence level (e.g., diving in harsh area) or the spatial resolution (e.g., many obstacles in the surrounding environment) and may switch to the corresponding operation modes based on the needs to improve the confidence level or spatial resolution.

In particular embodiments, in response to a change to one or more operational conditions, the system may switch between different operation modes (e.g., as shown in FIGS. 3A-C) to test the performance of the system (e.g., measurement accuracy, confidence level, SNR, etc.) and select the operation mode which provides the best performance under current environmental conditions. In particular embodiments, the LiDAR system performance may be gauged by one or more performance metrics (e.g., SNR, measurement accuracy, measurement precision, deviation from average, noise level, signal amplitude, detectable field of view, detectable distance/range, signal degradation, etc.). As an example and not by way of limitation, the LiDAR system may calculate the SNR while using different operation modes to determine which operation mode perform the best (e.g., highest SNR) under the current environmental conditions.

As another example, the LiDAR system may have its detectable distance reduced from 50 m to 20 m because of the change in the environmental conditions. The LiDAR system may test its detectable range using laser signals in all possible wavelength ranges under different operation mode to select the wavelength ranges and operation modes for the longest detectable distance. The LiDAR system may measure its detectable range by projecting many laser dots in a pre-determined pattern (e.g., points of cloud) into the environment and detect the number of dots, the dot pattern, and the boundary of the dot pattern based on the reflected light using a range estimation algorithm. The estimation algorithm may compare the parameters (e.g., number of dots, dot pattern, and boundary of dot pattern) related to the detected point cloud to corresponding threshold values and determine the confidence level of the measurement, which in turn may be used as the metric for selecting which operation models or/and wavelength ranges to use. The LiDAR system may measure the detectable range using laser signals in different wavelength ranges or/and different operation modes to improve the confidence level of measurement and maximize the detectable ranges. In particular embodiments, the performance metric may be calculated based on the system performance in one or more wavelength ranges. For example, the system may calculate a SNR or confidence level based on the system performance in the wavelength range of 940 nm±5 nm. As another example, the system may calculate a combined SNR or combined confidence level based on the combined performance of the multiple wavelength ranges (e.g., any combination of 760 nm±5 nm, 850 nm±5 nm, 905 nm±5 nm, 940 nm±5 nm, 1550 nm±5 nm).

In particular embodiments, when the environmental conditions negatively impact the LiDAR system's performance, the LiDAR system may perform an optimization calculation for the laser wavelength ranges based on the environmental conditions. The LiDAR system may test the performance using laser signals in different wavelength ranges and switch to the wavelength ranges which eliminate or minimize the impact from the environment. In particular embodiments, the LiDAR system may compare the performance on different sets of wavelength ranges and select the set of wavelength ranges which enable the best performance under current situation. In particular embodiments, the LiDAR system may compute a first performance metric (e.g., SNR, measurement accuracy, measurement precision, deviation from average, noise level, signal amplitude, detectable range, etc., or any combination thereof) based on a first measurement of reflected light associated with laser signals that are emitted by the LiDAR system and in a first set of wavelength ranges. The LiDAR system may compute a second performance metric (e.g., SNR, measurement accuracy, measurement precision, deviation from average, noise level, signal amplitude, detectable range, etc., or any combination thereof) based on a second measurement of reflected light associated with laser signals that are emitted by the LiDAR system and in a second set of wavelength ranges. In particular embodiments, the first and second set of wavelength ranges may be non-overlapping wavelength ranges or may share one or more overlapping wavelength ranges. The LiDAR system may compare the performance as indicated by the performance metrics to determine which set of wavelength ranges allows the system to perform best. The LiDAR system may select the first set of wavelength ranges or the second set of wavelength ranges based on the performance comparison result. The LiDAR system may configure its light source to emit laser signals in the newly selected set of wavelength ranges. The newly selected set of wavelength ranges may allow the LiDAR system to have better performance, as indicated by the performance metric, than the unselected set of wavelength ranges.

As an example and not by way of limitation, the LiDAR system may try operating in the wavelength range of 850 nm±5 nm (for simplicity, ±5 nm is used herein to denote a wavelength range, but a wavelength range not necessarily limited to ±5 nm, as it could be defined based on ±7 nm, ±10 nm, ±15 nm, ±21 nm, or any other suitable ranges) and determine that the SNR is lower than a threshold value because of the increased humidity in the environment. The LiDAR system may switch its laser signals to the wavelength range 760 nm±5 nm which has relatively shorter wavelengths than the water absorption wavelengths ranges and allows the system to have better SNR under the current environmental situation. Similar to the 850 nm, 905 nm and 940 nm wavelength ranges, there may be less solar background light in the wavelength range around 760 nm±5 nm due to the absorption characteristics of oxygen in the atmosphere. Unlike the 850 nm, 905 nm, and 940 nm ranges, the 760 nm±5 nm wavelength range may be less influenced by humidity. In particular embodiments, the LiDAR system's light detectors may have greater sensitivity for light with shorter wavelengths. By switching to relative shorter wavelengths, the LiDAR system may have better SNR by reducing the water absorption impact and increasing the light sensitivity at the same time. As another example and not by way of limitation, the LiDAR system may switch its laser signals back to the wavelength range of 850 nm±5 nm when the humidity decreases and allow the SNR to be above the threshold value. Regardless the humidity factor, using the longer 850 nm, 905 nm or 940 nm wavelength may be used by the LiDAR system to achieve longer measurable distance because light in longer wavelengths could travel farther.

In particular embodiments, the LiDAR system may adaptively select a particular wavelength range (e.g., 760 nm±5 nm) or a combination of multiple wavelength ranges (e.g., 760 nm±5 nm and 850 nm±5 nm). For example, the LiDAR system may operate on one of the wavelength ranges of 760 nm±5 nm, 850 nm±5 nm, 905 nm±5 nm, 940 nm±5 nm, and 1550 nm±5 nm. As another example, the LiDAR system may operate on any two wavelength ranges of 760 nm±5 nm, 850 nm±5 nm, 905 nm±5 nm, 940 nm±5 nm, and 1550 nm±5 nm. As another example, the LiDAR system may operate on all wavelength ranges of 760 nm±5 nm, 850 nm±5 nm, 905 nm±5 nm, 940 nm±5 nm, and 1550 nm±5 nm at the same time. The LiDAR system may switch between different wavelength ranges in a high speed. A wavelength range in which the LiDAR system operates may be defined by a central wavelength (e.g., 760 nm, 850 nm, 905 nm, or 940 nm) and a deviation range (e.g., +2 nm, +5 nm, +10 nm, +15 nm). It is notable that the wavelength ranges described here are for example purpose and the LiDAR system wavelength ranges can have any suitable wavelength ranges and are not limited thereof.

In particular embodiments, the system may adaptively select different wavelength ranges in response to a change in one of more environmental factors or operational conditions as described in the earlier section of this disclosure. The environmental conditions may include, for example, but are not limited to, environment humidity, environment temperature, atmosphere pressure, weather conditions (e.g., rain, sunshine, cloud, or fog), a road condition (e.g., passing by a lake, a spring, or a sprinkler truck), particles in the air (e.g., smoke, fire, fog, or dust), solar light intensity, etc. The LiDAR system may test its performance over different wavelength ranges after detecting a change in one or more of the environmental conditions and adaptively select the wavelengths to have better performance. For example, the LiDAR system may adaptively change its laser signal's operational wavelength ranges when the system detects that it starts to rain and the humidity starts to increase.

In particular embodiments, the LiDAR system may adaptively select or switch wavelength ranges based on the operational conditions of the LiDAR system. For example, the LiDAR system may test its performance in different wavelength ranges based on a pre-determined schedule and adaptively select wavelength ranges based on the testing results. As an example and not by way of limitation, the LiDAR system may probe the environmental condition and adaptively select wavelength ranges based on a pre-determined time interval (e.g., 10 seconds, 1 minutes, 2 minutes, 5, minutes, or 10 minutes).

In particular embodiments, the LiDAR system may adaptively select or switch wavelength ranges based on a change in one or more performance metrics of the LiDAR system. The LiDAR system may continuously collect data and monitor one or more performance metrics. For example, as discussed above, the LiDAR system may continuously monitor its SNR and, upon detecting the SNR dropping below a threshold or trending downwards, begin trying other wavelengths to see if doing so would improve the SNR. As another example, the LiDAR system may continuously perform measurements using different wavelengths and may discover that it is able to detect an object using laser signals in one wavelength range but cannot detect the object using laser signals in another wavelength range. The LiDAR system may try more wavelength ranges to detect the object and select the combination of the wavelength ranges which allow the most reliable detection of the object. As another example, the LiDAR system may detect a reduction of detectable range and may switch to more wavelength ranges to test the detectable range and select the combination of the wavelength ranges that enable the greatest detectable range under such situation. In particular embodiments, the LiDAR system may base its wavelength selection on a combination of different metrics, such as a combination of SNR, confidence measure, range, etc.

In particular embodiments, the LiDAR system may determine a confidence level (e.g., a confidence score) for its own performance and may determine, verify or modify the confidence levels for other sensing systems. For example, a vehicle may include different sensing systems including, for example, visual cameras, radars, other LiDAR systems or any other sensing systems. When it is raining, for example, and the LiDAR system cannot detect certain objects (e.g., other vehicles, road curb, or road sign) that it has been tracking, the LiDAR system may determine that the heavy rain is causing the LiDAR system to miss objects and the confidence level may need to be reduced (e.g., by 10%). Even if other sensing systems like visual cameras and radar may detect some of the objects, the LiDAR system may similarly reduce the confidence levels of these sensing systems based on the reduced confidence level of the measurement of the LiDAR system.

Vehicles or other systems may require redundancy in measurement channels (e.g., multiple sensing modalities) to make robust and reliable operation decisions. Particular embodiments of the LiDAR system may provide the alternative sensing modalities by using laser signals in multiple wavelength ranges. As an example and not by way of limitation, the LiDAR system may detect an object using laser signals in the wavelength range of 940 nm±5 nm. The LiDAR system may switch to laser signals in the wavelength ranges of 905 nm±5 nm, 850 nm±5 nm, and 760 nm±5 nm for detecting the same object. The LiDAR system may have better SNR and better measurement accuracy by using the laser signals in multiple wavelength ranges. The LiDAR system may improve the measurement confidence level and allow the vehicles to make more robust decisions.

Laser emitted by LiDAR systems may cause potential eyes-safety concerns for the people around, depending on the laser wavelength range, the laser power (e.g., light intensity), and the exposure time to eyes. The sensitivity of human retina usually drops off around the wavelength of 700 nm while most cameras can operate in the infrared area with longer wavelengths than 700 nm. LiDAR systems need to keep the emitted laser under a safety threshold to be safe for human eyes. In particular embodiments, the LiDAR system may optimize the power of the laser in all possible operational wavelength ranges of the LiDAR system in order to keep the laser power under the safety threshold in all those wavelength ranges. When the LiDAR system emits a laser in one wavelength range, the system may turn off other lasers in other wavelength ranges to reduce the total amount of power of the laser. In particular embodiments, the LiDAR system may determine a power distribution scheme to split power among a number of wavelength ranges to keep the laser in each wavelength range and in any combination of multiple wavelength ranges under the safety threshold. For example, the LiDAR system may allow lasers in different wavelength ranges to have the same power level or different power levels based on a power distribution scheme. The LiDAR system may have certain percentage of power for light in each wavelength range. The power distribution scheme may be pre-determined by the LiDAR system or may be dynamically determined based on the needs of the current situation. The LiDAR system may use the power distribution scheme to optimize power distribution among different wavelength ranges. In particular embodiments, the LiDAR system may generate laser signal pulses with very short duration (e.g., being shorter than a threshold duration) for each pulse to reduce the exposure time to human eyes, thereby improve eye safety.

Since the intensity of the emitted laser power may influence the detectable range of the LiDAR system, in particular embodiments, the LiDAR system may determine an optimized laser power level to keep the laser power under the safety threshold and, at the same time, keep the detectable range above a threshold range. In particular embodiments, the LiDAR system may use light detectors (e.g., a high sensitivity TOF camera) which have higher sensitivity than CMOS sensors. The high sensitivity detectors may have a longer detectable distance for the same amount of light power comparing to CMOS sensors. For the same detectable range, the high sensitivity detectors may allow the system to use lasers with lower power intensity, which is safer for human eyes, than systems using CMOS sensors. In particular embodiments, the LiDAR system may adaptively select one or a set of wavelength ranges for the laser signal to optimize the light detectors' outputs. For example, the LiDAR system may use laser signals in a combination of different wavelength ranges to maximize the number of photons that reach the light detectors. For the same amount of power of the emitted laser, the LiDAR system may have a longer detectable distance by having more photons reach the light detectors. For the same detectable distance, the LiDAR system may have a lower power level for the emitted laser, and therefore is safer for human eyes.

In particular embodiments, vehicles using a LiDAR system may have one or more cameras for computer vision purpose. The computer version cameras may have an operational wavelength range covering the visible wavelength range and going beyond the visible wavelength range (e.g., above 700 nm). The computer vision cameras may detect the light in the LiDAR system's operational wavelength ranges. When the LiDAR system switches its laser signals to shorter wavelength ranges which overlap with the computer vision cameras' operational wavelength ranges, the emitted and reflected light of the LiDAR system may be captured by the computer vision cameras which may increase the noise level in those wavelength ranges. In particular embodiments, the computer vision cameras may have filters to filter out the noise light caused by the LiDAR system. In some embodiments, the filters may be optical band-stop filters to filter out the light in the wavelength ranges (e.g., 760 nm±5 nm, 850 nm±5 nm, 905 nm±5 nm, 940 nm±5 nm, and 1550 nm±5 nm) used by the light source of the LiDAR system. In some embodiments, the filters may be digital filters to reduce the noise level in the corresponding wavelength ranges. For example, since the wavelengths, the firing time, and the stopping time of the laser can be known from the light source and the wavelength controller, the cameras may be controlled to eliminate the laser introduced noise using the signal processing algorithms for color rendering. In particular embodiments, the filters may include both of the optical filters and the digital filters to reduce the noise level.

In particular embodiments, one or more computer vision cameras of the system may not include the filters for filtering out the light in the LiDAR system's operational wavelength ranges (e.g., 760 nm±5 nm, 850 nm±5 nm, 905 nm±5 nm, 940 nm±5 nm, and 1550 nm±5 nm). Instead, the computer vision cameras may take advantage of the LiDAR system emitted light as an illuminating source for detecting objects in low-light conditions. For example, in a dark environment, the computer vision cameras may use the LiDAR system emitted light as the illuminating source to detect objects in the environment that are not detectable without the LiDAR system emitted light. As another example, vehicles using a LiDAR system may include cameras operating in the red wavelength range or/and the infrared wavelength range specifically for low-light conditions. The low-light cameras may have operational wavelength ranges near 700 nm or/and above 700 nm. In particular embodiments, the low-light cameras may not include the filters for filtering out the light in the LiDAR system's operational wavelength ranges and may take advantage of the LiDAR system emitted light as an illuminating source for detecting objects in low-light conditions. In low-light environments, the computer version cameras may capture one or more images based on the reflected light signals which are originated from the LiDAR system light source. The system may detect one or more object based on the captured images in this low-light environment using computer version technologies.

Figure 4:
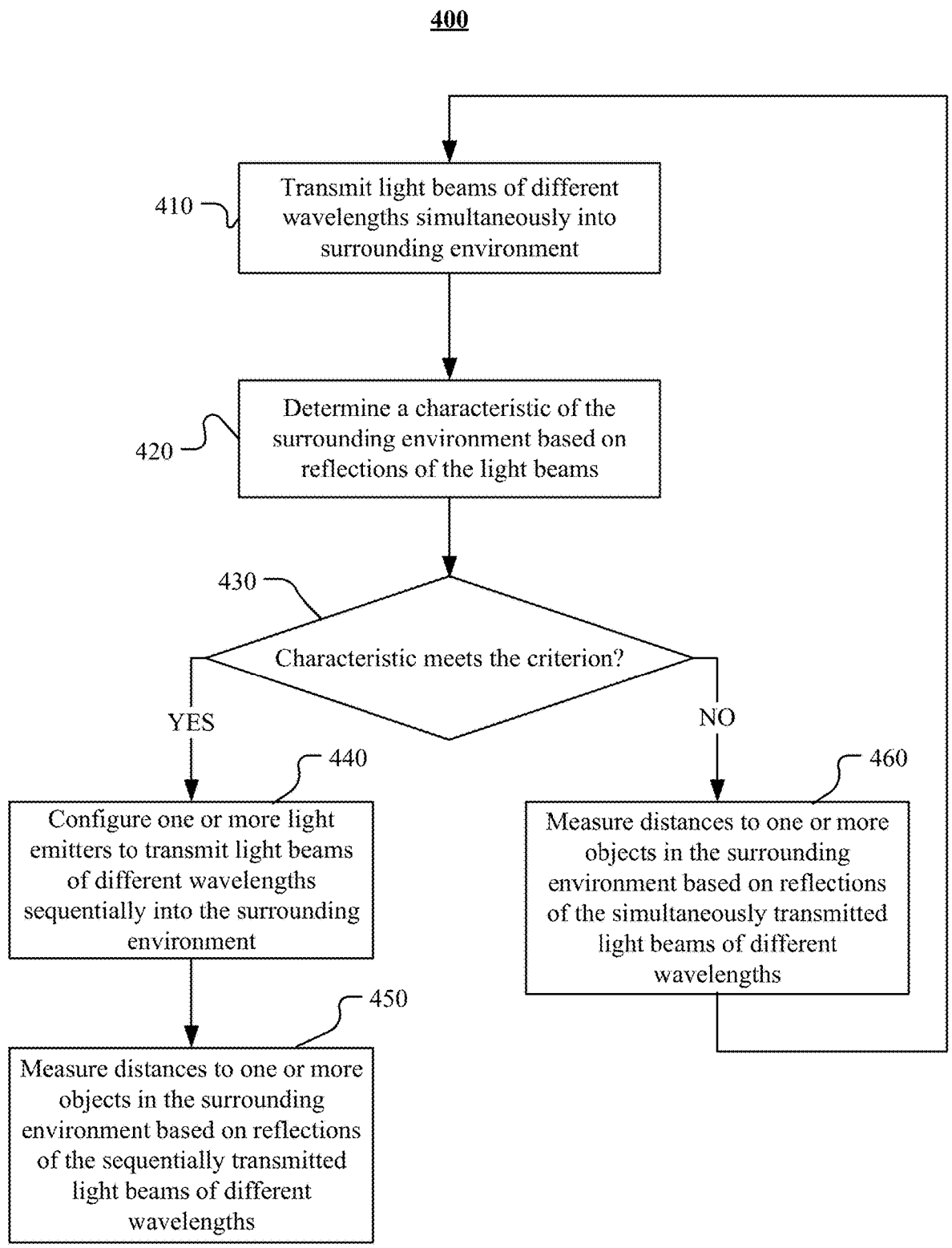
FIG. 4 illustrates a method for adaptively selecting operation modes based on environmental conditions.

FIG. 4 illustrates a method for adaptively selecting operation modes based on environmental conditions. The method may start at step 410, wherein the system may transmit, using one or more light emitters, light beams of different wavelengths simultaneously into a surrounding environment. The light beams of different wavelengths that are simultaneously transmitted into the surrounding environment may be transmitted into the surrounding environment along the same direction (e.g., hitting the same object). At step 420, the system may determine a characteristic of the surrounding environment based on reflections of the light beams. The characteristic of the surrounding environment may include a light penetration characteristic (e.g., light penetration rate, curve or trend, etc.) including a light absorption characteristic (e.g., light absorption rate, curve or trend, etc.) or a light scattering characteristic (e.g., light scattering rate, curve or trend, etc.). In particular embodiments, the system may determine the light penetration characteristic (e.g., light absorption characteristic or/and the light scattering characteristic) of the surrounding environment by comparing the light penetration rates of different wavelengths. At step 430, the system may determine whether the characteristic of the surrounding environment meets a characteristic criterion to configure the one or more light emitters in different operational modes for transmitting the light beams of different wavelengths. In particular embodiments, the characteristic criterion may include one or more characteristic signatures associated with an environmental baseline status. The system may compare the determined characteristic of the surrounding environment to one or more characteristic signatures associated with an environmental baseline status. When the characteristic of the surrounding environment deviates from the characteristic signatures associated with an environmental baseline status, the surrounding environment may have one or more environmental conditions (e.g., raining, fog, exhaust plume, etc.) that are different from the baseline status of the reference environmental condition. In response to the determination that the characteristic of the surrounding environment deviates from the characteristic signatures for a threshold range, the system may configure or keep the light emitters to emit light beams of different wavelengths simultaneously to measure the distances to the one or more objects in the surrounding environment based on the reflections of the light beams.

At step 440, in response to a determinization that the characteristic of the surrounding environment satisfies the criterion (e.g., matching the characteristic baseline associated with the reference environmental condition), the system may configure the one or more light emitters to transmit light beams of different wavelengths sequentially into the surrounding environment for measuring distances to one or more objects in the surrounding environment. At step 450, the system may measure distances to one or more objects in the surrounding environment based on reflections of the sequentially transmitted light beams of different wavelengths. At step 460, in response to a determinization that the characteristic of the surrounding environment does not satisfy the criterion (e.g., different from the characteristic baseline associated with the reference environmental condition), the system may configure or keep the one or more light emitters to transmit light beams of different wavelengths simultaneously into the surrounding environment and measure distances to one or more objects in the surrounding environment based on reflections of the simultaneously transmitted light beams of different wavelengths. In particular embodiments, the system may determine that a change of one or more environmental factors satisfies a change criterion (e.g., above a threshold value). In response to the determination that the change of the one or more environmental factors does not satisfy the change criterion, the system may configure the one or more light emitters to transmit light beams of different wavelengths simultaneously into the surrounding environment to determine the characteristic of the surrounding environment. The system may determine whether to configure the one or more light emitters to transmit light beams of different wavelengths simultaneously or sequentially for measuring distances to the one or more objects in the surrounding environment based on the characteristic of the surrounding environment.

In particular embodiments, the environmental factors may include one or more of, for example, but are not limited to, environmental humidity, environmental temperature, atmosphere pressure, a raining weather condition, a sunny weather condition, a cloudy weather condition, a foggy weather condition, a road condition, a number of obstacles in the surrounding environment, a nearby lake, a nearby spring, a sprinkler truck, a solar light intensity, an exhaust plume, a dust cloud, a particle density in air, etc. In particular embodiments, the one or more environmental factors may be determined based on, for example, but not limited to, a sensor associated with the computing system, a sensor fusion result, a data processing result, a communication from a second computing system, a current location, a navigation map, a weather forecast, a user operation, a user input, etc.

In particular embodiments, the system may determine whether an operational condition of the computing system satisfies an operational criterion. In response the determination that the operational condition satisfies the operational criterion, the system may configure the one or more light emitters to transmit light beams of different wavelengths simultaneously to the surrounding environment to determine the characteristic of the surrounding environment. The system may determine whether to configure the one or more light emitters to transmit light beams of different wavelengths simultaneously or sequentially for measuring distances to the one or more objects in the surrounding environment based on the characteristic of the surrounding environment. In particular embodiments, the operational conditions may include, for example, but are not limited to, a value of one or more performance metrics being below a threshold value, a deviation of one or more performance metrics from a reference value above a threshold range, a trend of one or more performance metrics satisfying a trend criterion, a time associated with a pre-determined schedule, a need to increase one or more performance aspects, a user operation input, etc.

As an example and not by way of limitation, the system may determine that a value of one or more performance metrics is below a threshold value and confiture the light emitters to operate in a different operation mode for transmitting light beams of different wavelengths to improve the performance metrics. As another example, the system may determine that a deviation of one or more performance metrics from a reference value is above a threshold range and configure the light emitters to operate in a different mode for transmitting light beams. As another example, the system may determine a trend of one or more performance metrics satisfying a trend criterion and switch the operation modes. As another example, the system may determine a time associated with a pre-determined schedule and switch the operation modes based on the scheduled time. As another example, the system may determine a need to improve one or more performance aspects (e.g., confidence level of measurement, spatial resolution of measurement, etc.) and configure the light emitters to transmit light in a different operation mode to improve the corresponding performance. As another example, the system may confiture the light emitters to transmit light beams in a different operation mode in response to a user operation (e.g., turning on the window wipers, turning on the defog function of air condition, turning on frog light, switching headlight from high-beam to low-beam mode) or/and a user input (e.g., user switching on high-safety driving mode).

In particular embodiments, the system may measure and track one or more performance metrics including, for example, but not limited to: a measurement confidence level, a spatial measurement resolution, a signal-to-noise ratio (SNR), a measurement accuracy, a measurement precision, a noise level, a signal amplitude, a detectable field of view, a detectable distance, a detectable range, a signal degradation metric, etc. In particular embodiments, the distances to the one or more objects in the surrounding environment may be measured based on measurements related to, for example, but not limited to, a light intensity, a time-of-flight, a point-cloud pattern, a boundary of a dot pattern, a number of dots of a dot pattern, a light signal amplitude, a light signal phase, a light signal wavelength, etc. In particular embodiments, the light beams emitted by the one or more light emitters may include one or more light signal pulses with each light signal pulse having a duration time shorter than an eye safety time threshold and the light beams in total having a power level below an eye safety power threshold. In particular embodiments, the system may (e.g., in low-light conditions) capture one or more images using a camera associated with the computing system based on the reflections of the light beams emitted by the one or more light emitters. The system detect one or more objects of interest based on the one or more images captured by the camera.

In particular embodiments, the LiDAR system may compute one or more performance metrics based on the measurement of laser signals in a first set of wavelength ranges. For example, the LiDAR system may calculate SNR based on the measurement of laser signals in a particular wavelength range (e.g., 940 nm±5 nm). As another example, the LiDAR system may calculate SNR based on the measurement of laser signals in two or more wavelength ranges (e.g., 940 nm±5 nm and 850 nm±5 nm). The LiDAR system may determine whether the performance metric meets a performance threshold. When the performance metric meets the performance threshold, the LiDAR system may continue to operate in current wavelength ranges. The LiDAR system may calculate and check its performance metric against the threshold based on a pre-determined schedule, one or more environmental conditions, one or more operational conditions, a user input, or a change of the one or more performance metrics.

The LiDAR system may compute one or more performance metrics based on the measurement of laser signals in a second set of wavelength ranges. The second set of wavelength ranges may be different with the first set of wavelength ranges or may have some overlapping wavelength ranges with the first set of wavelength ranges. For example, the LiDAR system may choose the wavelength range of 760 nm±5 nm to test and calculate SNR when the system detects a dramatic increase of the humidity in the environment while operating in the wavelength range of 940 nm±5 nm. As another example, the LiDAR system may test using laser signals in all possible wavelength ranges (e.g., 760 nm±5 nm, 850 nm±5 nm, 905 nm±5 nm, 940 nm±5 nm, and 1550 nm±5 nm, etc.) to see if any range or any combination of multiple ranges will allow the system to have a better SNR.

The LiDAR system may compare the performance metrics based on the measurement of laser signals in the first and second set of wavelength ranges. In particular embodiments, the LiDAR system may compare the performance metric of each tested wavelength range to an overall threshold in addition to each other wavelength range. In particular embodiments, the LiDAR system may compute the SNR for each tested wavelength range and generate a table of SNR to determine which wavelength range or which combination of wavelength ranges allow the best SNR under current situation. The LiDAR system may determine whether the LiDAR performance using the second set of wavelengths is better than the performance using the first set of wavelengths. When the first set wavelength range leads to better performance, the LiDAR system may select the first set of wavelength ranges. When the second wavelength range leads to better performance, the LiDAR system may select the second set of wavelength ranges. In particular embodiments, the selected wavelength ranges may have all different ranges from the wavelength ranges that the system had been operating in before the selection. In particular embodiments, the selected wavelength ranges may have some of the wavelength ranges different from the wavelength ranges that the system had been operating in before the selection. The LiDAR system may configure itself to operate with laser signals in the selected set of wavelength ranges.

In particular embodiments, the system may compute a first performance metric based on a first measurement of reflected light associated with laser signals, emitted by a LiDAR system, that are in a first wavelength range. The system may compute a second performance metric based on a second measurement of reflected light associated with laser signals, emitted by the LiDAR system, that are in a second wavelength range. The system may select the wavelength range that provides better performance based on a comparison between the first performance metric and the second performance metric. In particular embodiments, the system may repeat the comparison process on a number of wavelength ranges and select the one wavelength range that provides the best measurement performance (e.g., higher SNR, higher accuracy, longer detectable distance, etc.) among these wavelength ranges. The system may configure the LiDAR system to emit laser signals in the selected wavelength ranges.

In particular embodiments, the system may compute a first combined performance metric based on a measurement of reflected light associated with laser signals, emitted by the LiDAR system, that are in a first combination of a number of wavelengths ranges. The system may compute a second combined performance metric based on a measurement of reflected light associated with laser signals, emitted by the LiDAR system, that are in a second combination of the plurality of wavelengths ranges. The system may select the combination of wavelength that provides better performance based on a comparison between the first and second combined performance metrics. In particular embodiments, the system may repeat the comparison process on a number of combinations of wavelength ranges and select the combination of wavelength ranges that provide the best measurement performance (e.g., higher SNR, higher accuracy, longer detectable distance, etc.). The system may configure the LiDAR system to emit laser signals based on the selected combination of the plurality of wavelength ranges.

In particular embodiments, the system may determine an operational condition (e.g., one or more time periods for testing measurement with other wavelength ranges) of the LiDAR system based on a pre-determined schedule. The system may select one or more wavelength ranges based on the determined operational conditions of the LiDAR system and the pre-determined schedule and configure the LiDAR system to emit laser signals based on the selected one or more wavelength ranges. The selected wavelength ranges may allow the LiDAR system to have better performance than previously used wavelength ranges before the selection. In particular embodiments, the system may determine a value of one or more performance metrics of the LiDAR system being below a threshold value. The system may select one or more wavelength ranges in response to the determination that the value of the one or more performance metrics of the LiDAR system is below the threshold value. The system may configure the LiDAR system to emit laser signals based on the selected one or more wavelength ranges. The selected wavelength ranges may allow the LiDAR system to have better performance than previously used wavelength ranges before the selection.

In particular embodiments, the system may determine a trend (e.g., downward trend) of one or more performance metrics of the LiDAR system. The system may select one or more wavelength ranges based on the determined trend of the one or more performance metrics of the LiDAR system and configure the LiDAR system to emit laser signals based on the selected one or more wavelength ranges. The selected wavelength ranges may allow the LiDAR system to have better performance than previously used wavelength ranges before the selection. In particular embodiments, the system may determine a confidence level for each of the first and second measurements. Then, the system may determine a confidence level for a sensing system (e.g., cameras, radars or other LiDARs) associated with the computing system based on the first confidence level of the first and second measurements of the LiDAR system. For example, the system may reduce the confidence level of other sensing systems when the LiDAR system's confidence level has a drop.

In particular embodiments, the laser signals emitted by the LiDAR system may include one or more signal pulses with each signal pulse having a duration time shorter than an eye safety time threshold. The laser signals emitted by the LiDAR system may have a power level being below an eye safety power threshold. In particular embodiments, the system may receive time information from a wavelength controller and a time-of-flight (TOF) circuit associated with a reflected light signal. The system may determine a distance between the LiDAR system and an object of interest associated with the reflected light signal. The LiDAR system may be configured to emit light signals in a number of wavelength ranges according to a pre-determined time schedule (e.g., a synchronizing signal with periodical pulses) and may coordinate one or more light detectors for measuring reflected light signals based on the pre-determined time schedule (e.g., a synchronizing signal with periodical pulses) of the wavelength ranges. In particular embodiments, the system may capture one or more images using one or more cameras associated with the computing system based on reflected light signals originated from the LiDAR system. The system may detect one or more objects of interest based on the captured one or more images. In particular embodiments, the reflected light signals may be filtered by a number of single-bandpass filters and detected by a number of light detectors each of which covers one of the wavelength ranges of the light signals. In particular embodiments, the reflected light signals may be filtered by a multi-bandpass filter and detected by a single light detector covering all the wavelengths of the light signals.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for adaptively selecting operation modes based on environmental conditions including the particular steps of the method of FIG. 4, this disclosure contemplates any suitable method for adaptively selecting operation modes based on environmental conditions including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
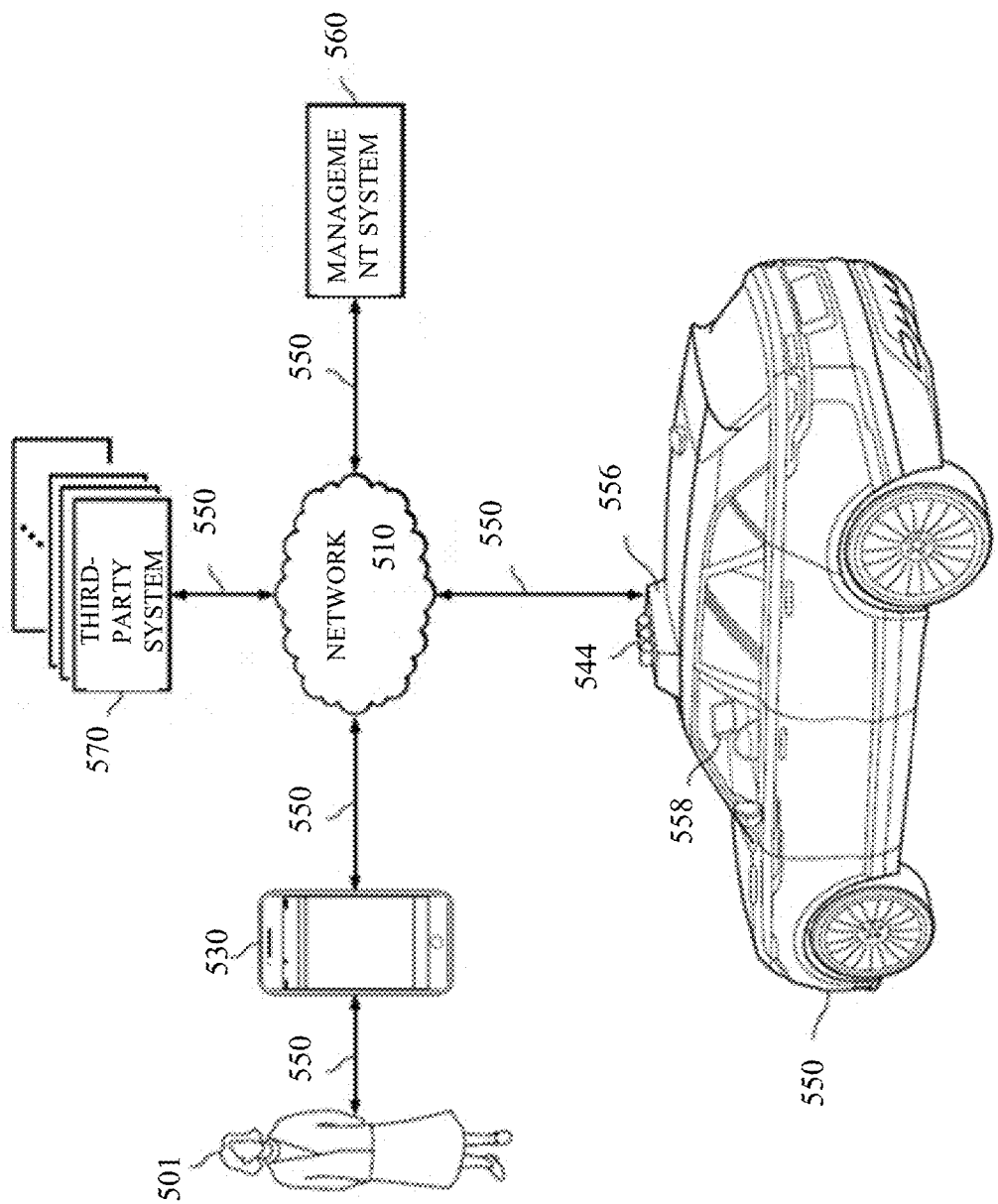
FIG. 5 illustrates an example block diagram of a transportation management environment for matching ride requestors with autonomous vehicles.

FIG. 5 illustrates an example block diagram of a transportation management environment for matching ride requestors with autonomous vehicles. In particular embodiments, the environment may include various computing entities, such as a user computing device 530 of a user 501 (e.g., a ride provider or requestor), a transportation management system 560, an autonomous vehicle 540, and one or more third-party system 570. The computing entities may be communicatively connected over any suitable network 510. As an example and not by way of limitation, one or more portions of network 510 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 5 illustrates a single user device 530, a single transportation management system 560, a single vehicle 540, a plurality of third-party systems 570, and a single network 510, this disclosure contemplates any suitable number of each of these entities. As an example and not by way of limitation, the network environment may include multiple users 501, user devices 530, transportation management systems 560, autonomous-vehicles 540, third-party systems 570, and networks 510.

The user device 530, transportation management system 560, autonomous vehicle 540, and third-party system 570 may be communicatively connected or co-located with each other in whole or in part. These computing entities may communicate via different transmission technologies and network types. For example, the user device 530 and the vehicle 540 may communicate with each other via a cable or short-range wireless communication (e.g., Bluetooth, NFC, WI-FI, etc.), and together they may be connected to the Internet via a cellular network that is accessible to either one of the devices (e.g., the user device 530 may be a smartphone with LTE connection). The transportation management system 560 and third-party system 570, on the other hand, may be connected to the Internet via their respective LAN/WLAN networks and Internet Service Providers (ISP). FIG. 5 illustrates transmission links 550 that connect user device 530, autonomous vehicle 540, transportation management system 560, and third-party system 570 to communication network 510. This disclosure contemplates any suitable transmission links 550, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 550 may connect to one or more networks 510, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 550. For example, the user device 530 may communicate with the transportation management system via a cellular network and the Internet, but communicate with the autonomous vehicle 540 via Bluetooth or a physical wire connection.

In particular embodiments, the transportation management system 560 may fulfill ride requests for one or more users 501 by dispatching suitable vehicles. The transportation management system 560 may receive any number of ride requests from any number of ride requestors 501. In particular embodiments, a ride request from a ride requestor 501 may include an identifier that identifies the ride requestor in the system 560. The transportation management system 560 may use the identifier to access and store the ride requestor's 501 information, in accordance with the requestor's 501 privacy settings. The ride requestor's 501 information may be stored in one or more data stores (e.g., a relational database system) associated with and accessible to the transportation management system 560. In particular embodiments, ride requestor information may include profile information about a particular ride requestor 501. In particular embodiments, the ride requestor 501 may be associated with one or more categories or types, through which the ride requestor 501 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 560 may classify a user 501 based on known information about the user 501 (e.g., using machine-learning classifiers), and use the classification to retrieve relevant aggregate information associated with that class. For example, the system 560 may classify a user 501 as a young adult and retrieve relevant aggregate information associated with young adults, such as the type of music generally preferred by young adults.

Transportation management system 560 may also store and access ride information. Ride information may include locations related to the ride, traffic data, route options, optimal pick-up or drop-off locations for the ride, or any other suitable information associated with a ride. As an example and not by way of limitation, when the transportation management system 560 receives a request to travel from San Francisco International Airport (SFO) to Palo Alto, Calif., the system 560 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 560. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 560. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 560 in particular embodiments may predict and provide ride suggestions in response to a ride request. In particular embodiments, the system 560 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 560 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 560 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 530 (which may belong to a ride requestor or provider), a transportation management system 560, vehicle system 540, or a third-party system 570 to process, transform, manage, retrieve, modify, add, or delete the information stored in the data store.

In particular embodiments, transportation management system 560 may include an authorization server (or any other suitable component(s)) that allows users 501 to opt-in to or opt-out of having their information and actions logged, recorded, or sensed by transportation management system 560 or shared with other systems (e.g., third-party systems 570). In particular embodiments, a user 501 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 501 of transportation management system 560 through blocking, data hashing, anonymization, or other suitable techniques as appropriate.

In particular embodiments, third-party system 570 may be a network-addressable computing system that may provide HD maps or host GPS maps, customer reviews, music or content, weather information, or any other suitable type of information. Third-party system 570 may generate, store, receive, and send relevant data, such as, for example, map data, customer review data from a customer review website, weather data, or any other suitable type of data. Third-party system 570 may be accessed by the other computing entities of the network environment either directly or via network 510. For example, user device 530 may access the third-party system 570 via network 510, or via transportation management system 560. In the latter case, if credentials are required to access the third-party system 570, the user 501 may provide such information to the transportation management system 560, which may serve as a proxy for accessing content from the third-party system 570.

In particular embodiments, user device 530 may be a mobile computing device such as a smartphone, tablet computer, or laptop computer. User device 530 may include one or more processors (e.g., CPU and/or GPU), memory, and storage. An operating system and applications may be installed on the user device 530, such as, e.g., a transportation application associated with the transportation management system 560, applications associated with third-party systems 570, and applications associated with the operating system. User device 530 may include functionality for determining its location, direction, or orientation, based on integrated sensors such as GPS, compass, gyroscope, or accelerometer. User device 530 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 530 may also include one or more cameras, scanners, touchscreens, microphones, speakers, and any other suitable input-output devices.

In particular embodiments, the vehicle 540 may be an autonomous vehicle and equipped with an array of sensors 544, a navigation system 546, and a ride-service computing device 548. In particular embodiments, a fleet of autonomous vehicles 540 may be managed by the transportation management system 560. The fleet of autonomous vehicles 540, in whole or in part, may be owned by the entity associated with the transportation management system 560, or they may be owned by a third-party entity relative to the transportation management system 560. In either case, the transportation management system 560 may control the operations of the autonomous vehicles 540, including, e.g., dispatching select vehicles 540 to fulfill ride requests, instructing the vehicles 540 to perform select operations (e.g., head to a service center or charging/fueling station, pull over, stop immediately, self-diagnose, lock/unlock compartments, change music station, change temperature, and any other suitable operations), and instructing the vehicles 540 to enter select operation modes (e.g., operate normally, drive at a reduced speed, drive under the command of human operators, and any other suitable operational modes).

In particular embodiments, the autonomous vehicles 540 may receive data from and transmit data to the transportation management system 560 and the third-party system 570. Example of received data may include, e.g., instructions, new software or software updates, maps, 3D models, trained or untrained machine-learning models, location information (e.g., location of the ride requestor, the autonomous vehicle 540 itself, other autonomous vehicles 540, and target destinations such as service centers), navigation information, traffic information, weather information, entertainment content (e.g., music, video, and news) ride requestor information, ride information, and any other suitable information. Examples of data transmitted from the autonomous vehicle 540 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 540, passengers may send/receive data to the transportation management system 560 and/or third-party system 570), and any other suitable data.

In particular embodiments, autonomous vehicles 540 may also communicate with each other as well as other traditional human-driven vehicles, including those managed and not managed by the transportation management system 560. For example, one vehicle 540 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 560 or third-party system 570).

In particular embodiments, an autonomous vehicle 540 may obtain and process sensor/telemetry data. Such data may be captured by any suitable sensors. For example, the vehicle 540 may have a Light Detection and Ranging (LiDAR) sensor array of multiple LiDAR transceivers that are configured to rotate 360°, emitting pulsed laser light and measuring the reflected light from objects surrounding vehicle 540. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 540. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 540 may have optical cameras pointing in different directions. The cameras may be used for, e.g., recognizing roads, lane markings, street signs, traffic lights, police, other vehicles, and any other visible objects of interest. To enable the vehicle 540 to "see" at night, infrared cameras may be installed. In particular embodiments, the vehicle may be equipped with stereo vision for, e.g., spotting hazards such as pedestrians or tree branches on the road. As another example, the vehicle 540 may have radars for, e.g., detecting other vehicles and/or hazards afar. Furthermore, the vehicle 540 may have ultrasound equipment for, e.g., parking and obstacle detection. In addition to sensors enabling the vehicle 540 to detect, measure, and understand the external world around it, the vehicle 540 may further be equipped with sensors for detecting and self-diagnosing the vehicle's own state and condition. For example, the vehicle 540 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 540 may build a 3D model of its surrounding based on data from its LiDAR, radar, sonar, and cameras, along with a pre-generated map obtained from the transportation management system 560 or the third-party system 570. Although sensors 544 appear in a particular location on autonomous vehicle 540 in FIG. 5, sensors 544 may be located in any suitable location in or on autonomous vehicle 540. Example locations for sensors include the front and rear bumpers, the doors, the front windshield, on the side panel, or any other suitable location.

In particular embodiments, the autonomous vehicle 540 may be equipped with a processing unit (e.g., one or more CPUs and GPUs), memory, and storage. The vehicle 540 may thus be equipped to perform a variety of computational and processing tasks, including processing the sensor data, extracting useful information, and operating accordingly. For example, based on images captured by its cameras and a machine-vision model, the vehicle 540 may identify particular types of objects captured by the images, such as pedestrians, other vehicles, lanes, curbs, and any other objects of interest.

In particular embodiments, the autonomous vehicle 540 may have a navigation system 546 responsible for safely navigating the autonomous vehicle 540. In particular embodiments, the navigation system 546 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 546 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 546 may use its determinations to control the vehicle 540 to operate in prescribed manners and to guide the autonomous vehicle 540 to its destinations without colliding into other objects. Although the physical embodiment of the navigation system 546 (e.g., the processing unit) appears in a particular location on autonomous vehicle 540 in FIG. 5, navigation system 546 may be located in any suitable location in or on autonomous vehicle 540. Example locations for navigation system 546 include inside the cabin or passenger compartment of autonomous vehicle 540, near the engine/battery, near the front seats, rear seats, or in any other suitable location.

In particular embodiments, the autonomous vehicle 540 may be equipped with a ride-service computing device 548, which may be a tablet or any other suitable device installed by transportation management system 560 to allow the user to interact with the autonomous vehicle 540, transportation management system 560, other users 501, or third-party systems 570. In particular embodiments, installation of ride-service computing device 548 may be accomplished by placing the ride-service computing device 548 inside autonomous vehicle 540, and configuring it to communicate with the vehicle 540 via a wire or wireless connection (e.g., via Bluetooth). Although FIG. 5 illustrates a single ride-service computing device 548 at a particular location in autonomous vehicle 540, autonomous vehicle 540 may include several ride-service computing devices 548 in several different locations within the vehicle. As an example and not by way of limitation, autonomous vehicle 540 may include four ride-service computing devices 548 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 548 may be detachable from any component of autonomous vehicle 540. This may allow users to handle ride-service computing device 548 in a manner consistent with other tablet computing devices. As an example and not by way of limitation, a user may move ride-service computing device 548 to any location in the cabin or passenger compartment of autonomous vehicle 540, may hold ride-service computing device 548, or handle ride-service computing device 548 in any other suitable manner. Although this disclosure describes providing a particular computing device in a particular manner, this disclosure contemplates providing any suitable computing device in any suitable manner.

Figure 6:
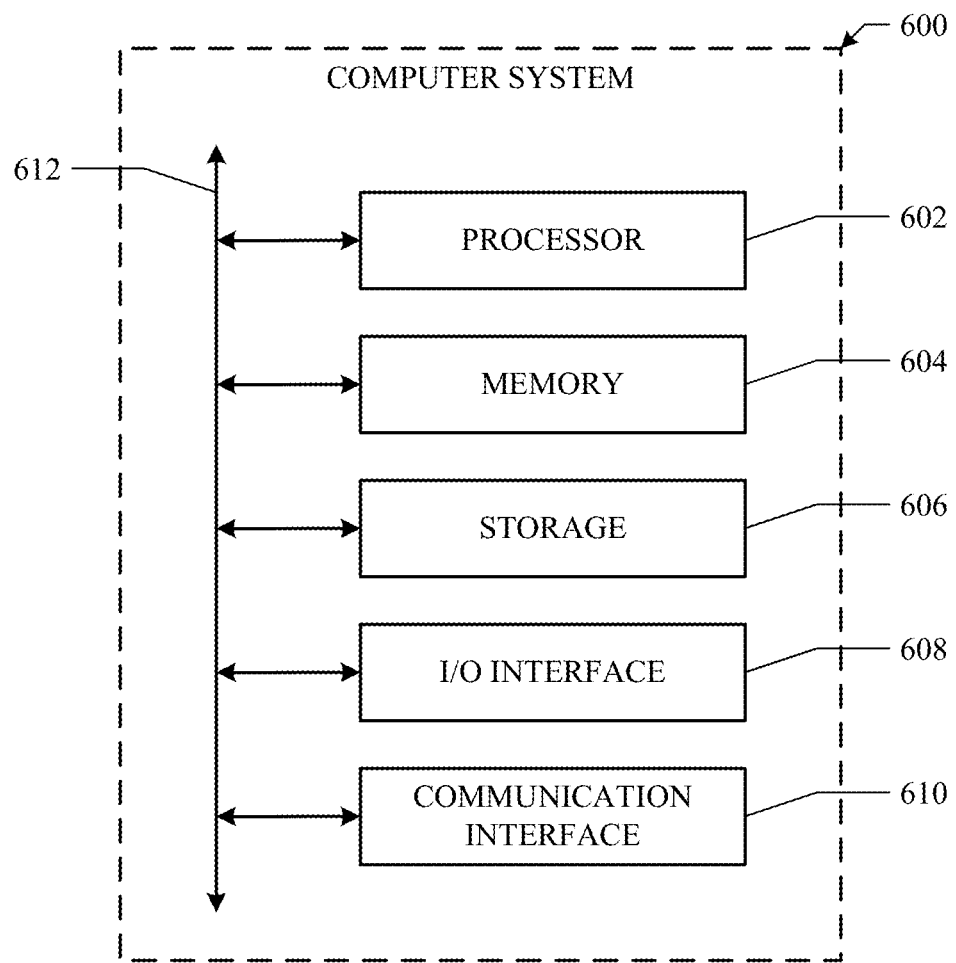
FIG. 6 illustrates an example of a computing system.

FIG. 6 illustrates an example computer system 600. In particular embodiments, one or more computer systems 600 perform one or more steps of one or more methods described or illustrated herein. In particular embodiments, one or more computer systems 600 provide the functionalities described or illustrated herein. In particular embodiments, software running on one or more computer systems 600 performs one or more steps of one or more methods described or illustrated herein or provides the functionalities described or illustrated herein. Particular embodiments include one or more portions of one or more computer systems 600. Herein, a reference to a computer system may encompass a computing device, and vice versa, where appropriate. Moreover, a reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 that are to be operated on by computer instructions; the results of previous instructions executed by processor 602 that are accessible to subsequent instructions or for writing to memory 604 or storage 606; or any other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs), be a multi-core processor, or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described in further detail below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
transmitting, using one or more light emitters, light beams of different wavelengths simultaneously into a surrounding environment;
determining a characteristic of the surrounding environment based on reflections of the light beams; and
in response to a determination that the characteristic of the surrounding environment meets a threshold, configuring the one or more light emitters to transmit light beams of different wavelengths sequentially into the surrounding environment for measuring distances to one or more objects in the surrounding environment, wherein the characteristic meets the threshold when the characteristic is above the threshold.

2. The method of claim 1, wherein the threshold comprises a characteristic signature associated with an environmental baseline status, further comprising:
in response to the determination that the characteristic of the surrounding environment deviates from the characteristic signature for a threshold range, measuring the distances to the one or more objects in the surrounding environment based on the reflections of the light beams of different wavelengths that are simultaneously transmitted into the surrounding environment.

3. The method of claim 2, wherein a measurement based on the reflections of the light beams of the different wavelengths that are simultaneously transmitted into the surrounding environment has a higher confidence level than the measurement based on the reflections of the light beams of the different wavelengths that are sequentially transmitted into the surrounding environment.

4. The method of claim 1, wherein the light beams of different wavelengths that are simultaneously transmitted into the surrounding environment are transmitted into the surrounding environment along a same direction.

5. The method of claim 1, wherein the characteristic of the surrounding environment comprises a light penetration characteristic at one or more wavelengths.

6. The method of claim 5, wherein the light penetration characteristic is determined by comparing light penetration rates of different wavelengths.

7. The method of claim 1, further comprising:
determining that a change of one or more environmental factors satisfies a change threshold;
in response to the determination that the change of the one or more environmental factors satisfies the change threshold, configuring the one or more light emitters to transmit light beams of different wavelengths simultaneously into the surrounding environment to determine the characteristic of the surrounding environment; and
determining whether to configure the one or more light emitters to transmit light beams of different wavelengths simultaneously or sequentially for measuring distances to the one or more objects in the surrounding environment based on the characteristic of the surrounding environment.

8. The method of claim 7, wherein the one or more environmental factors comprise one or more of:
environmental humidity;
environmental temperature;
atmosphere pressure;
a raining weather condition;
a sunny weather condition;
a cloudy weather condition;
a foggy weather condition;
a road condition;
a number of obstacles in the surrounding environment;
a nearby lake;
a nearby spring;
a sprinkler truck;
a solar light intensity;
an exhaust plume;
a dust cloud; or
a particle density in air.

9. The method of claim 7, further comprising:
determining the one or more environmental factors based on one or more of:
a sensor associated with the computing system;
a communication from a second computing system;
a current location;
a navigation map;
a weather forecast;
a user operation; or a user input.

10. The method of claim 1, further comprising:
determining that an operational condition of the computing system meets an operational threshold;
in response to the determination that the operational condition meets an operational threshold, configuring the one or more light emitters to transmit light beams of different wavelengths simultaneously into the surrounding environment to determine the characteristic of the surrounding environment; and
determining whether to configure the one or more light emitters to transmit light beams of different wavelengths simultaneously or sequentially for measuring distances to the one or more objects in the surrounding environment based on the characteristic of the surrounding environment.

11. The method of claim 10, wherein the operational condition comprises on one or more of:
a value of one or more performance metrics being below a threshold value;
a deviation of one or more performance metrics from a reference value above a threshold range;
a trend of one or more performance metrics satisfying a trend criterion;
a time associated with a pre-determined schedule;
a need to increase one or more performance aspects; or
a user operation input.

12. The method of claim 11, wherein the one or more performance metrics comprise one or more of:
a measurement of confidence level;
a spatial measurement resolution;
a signal-to-noise ratio (SNR);
a measurement accuracy;
a measurement precision;
a noise level;
a signal amplitude;
a detectable field of view;
a detectable distance;
a detectable range; or
a signal degradation metric.

13. A system comprising: one or more processors and one or more computer-readable non-transitory storage media coupled to one or more of the processors, the one or more computer-readable non-transitory storage media comprising instructions operable when executed by one or more of the processors to cause the system to:
- transmit, using one or more light emitters, light beams of different wavelengths simultaneously into a surrounding environment;
- determine a characteristic of the surrounding environment based on reflections of the light beams; and
- in response to a determination that the characteristic of the surrounding environment meets a threshold, configure the one or more light emitters to transmit light beams of different wavelengths sequentially into the surrounding environment for measuring distances to one or more objects in the surrounding environment, wherein the characteristic meets the threshold when the characteristic is above the threshold.

14. The system of claim 13, wherein the threshold comprise a characteristic signature associated with an environmental baseline status, further comprising:
- in response to the determination that the characteristic of the surrounding environment deviates from the characteristic signature for a threshold range, measuring the distances to the one or more objects in the surrounding environment based on the reflections of the light beams of different wavelengths that are simultaneously transmitted into the surrounding environment.

15. The system of claim 14, wherein a measurement based on the reflections of the light beams of the different wavelengths that are simultaneously transmitted into the surrounding environment has a higher confidence level than the measurement based on the reflections of the light beams of the different wavelengths that are sequentially transmitted into the surrounding environment.

16. The system of claim 13, wherein the characteristic of the surrounding environment comprises a light penetration characteristic at one or more wavelengths, and wherein the light penetration characteristic is determined by comparing light penetration rates of different wavelengths.

17. One or more computer-readable non-transitory storage media embodying software that is operable when executed to:
- transmit, using one or more light emitters, light beams of different wavelengths simultaneously into a surrounding environment;
- determine a characteristic of the surrounding environment based on reflections of the light beams; and
- in response to a determination that the characteristic of the surrounding environment meets a threshold, configure the one or more light emitters to transmit light beams of different wavelengths sequentially into the surrounding environment for measuring distances to one or more objects in the surrounding environment, wherein the characteristic meets the threshold when the characteristic is above the threshold.

18. The one or more computer-readable non-transitory storage media of claim 17, wherein the threshold comprises a characteristic signature associated with an environmental baseline status, further comprising:
- in response to the determination that the characteristic of the surrounding environment deviates from the characteristic signature for a threshold range, measuring the distances to the one or more objects in the surrounding environment based on the reflections of the light beams of different wavelengths that are simultaneously transmitted into the surrounding environment.

19. The one or more computer-readable non-transitory storage media of claim 18, wherein the measurement based on the reflections of the light beams of the different wavelengths that are simultaneously transmitted into the surrounding environment has a higher confidence level than the measurement based on the reflections of the light beams of the different wavelengths that are sequentially transmitted into the surrounding environment.

20. The one or more computer-readable non-transitory storage media of claim 17, wherein the characteristic of the surrounding environment comprises a light penetration characteristic at one or more wavelengths, and wherein the light penetration characteristic is determined by comparing light penetration rates of different wavelengths.

* * * * *